(12) United States Patent
Kummer et al.

(10) Patent No.: US 9,860,477 B2
(45) Date of Patent: Jan. 2, 2018

(54) CUSTOMIZED VIDEO MOSAIC

(71) Applicant: EchoStar Technologies, L.L.C., Englewood, CO (US)

(72) Inventors: David Kummer, Highlands Ranch, CO (US); Luke VanDuyn, Highlands Ranch, CO (US); Morgan Kirby, Palmer Lake, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 14/139,299

(22) Filed: Dec. 23, 2013

(65) Prior Publication Data

US 2015/0181132 A1 Jun. 25, 2015

(51) Int. Cl.
*H04N 5/50* (2006.01)
*H04N 21/431* (2011.01)
(Continued)

(52) U.S. Cl.
CPC ............ *H04N 5/50* (2013.01); *H04N 5/2624* (2013.01); *H04N 5/44591* (2013.01);
(Continued)

(58) Field of Classification Search
CPC ........... H04N 21/482; H04N 21/44543; H04N 21/4532; H04N 5/4403; H04N 21/23439; H04N 21/235; H04N 21/4312; H04N 21/4383; H04N 21/454; H04N 21/4622; H04N 21/4263; H04N 21/4325;
(Continued)

(56) References Cited

U.S. PATENT DOCUMENTS 6,005,562 A    12/1999   Shiga et al.
6,177,931 B1   1/2001   Alexander et al.
(Continued)

FOREIGN PATENT DOCUMENTS

EP    1 865 716 A2   12/2007
EP    2 309 733 B1    4/2011
(Continued)

OTHER PUBLICATIONS

International Search Report and Written Opinion of PCT/US2014/033796 dated Sep. 5, 2014, 12 pages.
(Continued)

*Primary Examiner* — Brian T Pendleton
*Assistant Examiner* — Krista A Contino Saumby
(74) *Attorney, Agent, or Firm* — Kilpatrick Townsend & Stockton LLP

(57) ABSTRACT

Various arrangements for outputting a customized video mosaic are presented. Based on received user input, it may be determined that a customized video mosaic is to be output for presentation. A plurality of television channels to be presented as part of the customized video mosaic may be determined. One or more tuners may be tuned based on the determined plurality of television channels to be presented. The plurality of television channels may be output for presentation to a presentation device. Each of these television channels may be presented by the presentation device as live video simultaneously as part of the customized video mosaic.

16 Claims, 9 Drawing Sheets

(51) Int. Cl.
| | |
|---|---|
| *H04N 21/438* | (2011.01) |
| *H04N 21/454* | (2011.01) |
| *H04N 21/462* | (2011.01) |
| *H04N 21/426* | (2011.01) |
| *H04N 21/432* | (2011.01) |
| *H04N 21/4402* | (2011.01) |
| *H04N 21/439* | (2011.01) |
| *H04N 21/433* | (2011.01) |
| *H04N 21/84* | (2011.01) |
| *H04N 21/45* | (2011.01) |
| *H04N 21/4147* | (2011.01) |
| *H04N 5/445* | (2011.01) |
| *H04N 21/482* | (2011.01) |
| *H04N 5/262* | (2006.01) |

(52) U.S. Cl.
CPC ..... *H04N 21/4147* (2013.01); *H04N 21/4263* (2013.01); *H04N 21/4312* (2013.01); *H04N 21/4316* (2013.01); *H04N 21/4325* (2013.01); *H04N 21/4334* (2013.01); *H04N 21/4383* (2013.01); *H04N 21/4398* (2013.01); *H04N 21/440263* (2013.01); *H04N 21/454* (2013.01); *H04N 21/4532* (2013.01); *H04N 21/4622* (2013.01); *H04N 21/482* (2013.01); *H04N 21/84* (2013.01); *H04N 2005/44556* (2013.01)

(58) Field of Classification Search
CPC ....... H04N 21/4316; H04N 21/440263; H04N 21/4398; H04N 21/4334; H04N 21/4147; H04N 5/44591; H04N 5/2624; H04N 5/50; H04N 2005/44556; H04H 60/72
See application file for complete search history.

(56) References Cited

U.S. PATENT DOCUMENTS

| | | | |
|---|---|---|---|
| 6,681,396 B1 | 1/2004 | Bates et al. | |
| 7,174,512 B2 | 2/2007 | Martin et al. | |
| 7,197,715 B1 | 3/2007 | Valeria | |
| 7,633,887 B2 | 12/2009 | Panwar et al. | |
| 7,680,894 B2 | 3/2010 | Diot et al. | |
| 7,774,811 B2 | 8/2010 | Poslinski et al. | |
| 7,818,368 B2 | 10/2010 | Yang et al. | |
| 7,825,989 B1 | 11/2010 | Greenberg | |
| 7,849,487 B1 | 12/2010 | Vosseller | |
| 8,024,753 B1 | 9/2011 | Kummer et al. | |
| 8,046,798 B1 | 10/2011 | Schlack et al. | |
| 8,079,052 B2 | 12/2011 | Chen et al. | |
| 8,104,065 B2 | 1/2012 | Aaby et al. | |
| 8,209,713 B1 | 6/2012 | Lai et al. | |
| 8,296,797 B2 | 10/2012 | Olstad et al. | |
| 8,312,486 B1 | 11/2012 | Briggs et al. | |
| 8,424,041 B2 | 4/2013 | Candelore et al. | |
| 8,427,356 B1 | 4/2013 | Satish | |
| 8,627,349 B2 | 1/2014 | Kirby et al. | |
| 8,689,258 B2 | 4/2014 | Kemp | |
| 8,752,084 B1 | 6/2014 | Lai et al. | |
| 8,973,038 B2 | 3/2015 | Gratton | |
| 8,973,068 B2 | 3/2015 | Kotecha et al. | |
| 8,990,418 B1 | 3/2015 | Bragg et al. | |
| 9,038,127 B2 | 5/2015 | Hastings et al. | |
| 9,066,156 B2 | 6/2015 | Kapa | |
| 9,213,986 B1 | 12/2015 | Buchheit et al. | |
| 9,253,533 B1 | 2/2016 | Morgan et al. | |
| 9,264,779 B2 | 2/2016 | Kirby et al. | |
| 9,420,333 B2 | 8/2016 | Martch et al. | |
| 2001/0013123 A1 | 8/2001 | Freeman et al. | |
| 2001/0026609 A1 | 10/2001 | Weinstein et al. | |
| 2002/0059610 A1 | 5/2002 | Ellis | |
| 2002/0067376 A1* | 6/2002 | Martin | G06Q 30/02 715/810 |
| 2002/0075402 A1 | 6/2002 | Robson et al. | |
| 2002/0166122 A1* | 11/2002 | Kikinis | H04N 5/44543 725/56 |
| 2002/0174430 A1 | 11/2002 | Ellis et al. | |
| 2002/0178444 A1 | 11/2002 | Trajkovic et al. | |
| 2003/0023742 A1 | 1/2003 | Allen et al. | |
| 2003/0056220 A1 | 3/2003 | Thornton et al. | |
| 2003/0066077 A1 | 4/2003 | Gutta et al. | |
| 2003/0118014 A1 | 6/2003 | Iyer et al. | |
| 2003/0126605 A1 | 7/2003 | Betz et al. | |
| 2003/0126606 A1 | 7/2003 | Buczak et al. | |
| 2003/0188317 A1 | 10/2003 | Liew et al. | |
| 2003/0189674 A1 | 10/2003 | Inoue et al. | |
| 2003/0208763 A1 | 11/2003 | McElhatten et al. | |
| 2003/0229899 A1 | 12/2003 | Thompson et al. | |
| 2004/0181807 A1 | 9/2004 | Theiste et al. | |
| 2005/0030977 A1 | 2/2005 | Casey et al. | |
| 2005/0044570 A1 | 2/2005 | Poslinski | |
| 2005/0071865 A1 | 3/2005 | Martins | |
| 2005/0125302 A1 | 6/2005 | Brown et al. | |
| 2005/0152565 A1 | 7/2005 | Jouppi et al. | |
| 2005/0166230 A1 | 7/2005 | Gaydou et al. | |
| 2005/0180568 A1 | 8/2005 | Krause | |
| 2005/0191041 A1 | 9/2005 | Braun et al. | |
| 2005/0240961 A1 | 10/2005 | Jerding et al. | |
| 2005/0264705 A1 | 12/2005 | Kitamura | |
| 2006/0020962 A1 | 1/2006 | Stark et al. | |
| 2006/0085828 A1 | 4/2006 | Dureau et al. | |
| 2006/0174277 A1 | 8/2006 | Sezan et al. | |
| 2006/0190615 A1 | 8/2006 | Panwar et al. | |
| 2006/0238656 A1 | 10/2006 | Chen et al. | |
| 2006/0253581 A1 | 11/2006 | Dixon et al. | |
| 2006/0282852 A1 | 12/2006 | Purpura et al. | |
| 2006/0282869 A1 | 12/2006 | Plourde, Jr. | |
| 2007/0033616 A1 | 2/2007 | Gutta | |
| 2007/0058930 A1 | 3/2007 | Iwamoto | |
| 2007/0074256 A1* | 3/2007 | Jung | H04N 7/17354 725/100 |
| 2007/0083901 A1 | 4/2007 | Bond | |
| 2007/0127894 A1 | 6/2007 | Ando et al. | |
| 2007/0146554 A1 | 6/2007 | Strickland et al. | |
| 2007/0154163 A1 | 7/2007 | Cordray | |
| 2007/0154169 A1 | 7/2007 | Cordray et al. | |
| 2007/0157235 A1 | 7/2007 | Teunissen | |
| 2007/0157249 A1 | 7/2007 | Cordray et al. | |
| 2007/0157253 A1 | 7/2007 | Ellis et al. | |
| 2007/0188655 A1 | 8/2007 | Ohta | |
| 2007/0199040 A1 | 8/2007 | Kates | |
| 2007/0204302 A1 | 8/2007 | Calzone | |
| 2007/0226766 A1 | 9/2007 | Poslinski et al. | |
| 2007/0245379 A1 | 10/2007 | Agnihortri | |
| 2008/0022012 A1 | 1/2008 | Wang | |
| 2008/0060006 A1* | 3/2008 | Shanks | H04N 5/44543 725/38 |
| 2008/0086743 A1 | 4/2008 | Cheng et al. | |
| 2008/0097949 A1 | 4/2008 | Kelly et al. | |
| 2008/0109307 A1 | 5/2008 | Ullah | |
| 2008/0134043 A1* | 6/2008 | Georgis et al. | 715/733 |
| 2008/0163305 A1 | 7/2008 | Johnson et al. | |
| 2008/0195457 A1 | 8/2008 | Sherman et al. | |
| 2008/0235348 A1 | 9/2008 | Dasgupta | |
| 2008/0239169 A1 | 10/2008 | Moon et al. | |
| 2008/0300982 A1 | 12/2008 | Larson et al. | |
| 2008/0320523 A1 | 12/2008 | Morris et al. | |
| 2009/0044217 A1 | 2/2009 | Lutterbach et al. | |
| 2009/0055385 A1 | 2/2009 | Jeon et al. | |
| 2009/0102984 A1 | 4/2009 | Arling et al. | |
| 2009/0138902 A1 | 5/2009 | Kamen | |
| 2009/0178071 A1 | 7/2009 | Whitehead | |
| 2009/0234828 A1 | 9/2009 | Tu | |
| 2009/0249412 A1 | 10/2009 | Bhogal et al. | |
| 2009/0293093 A1* | 11/2009 | Igarashi | H04N 21/23439 725/115 |
| 2009/0299824 A1 | 12/2009 | Barnes, Jr. | |
| 2009/0325523 A1 | 12/2009 | Choi | |
| 2010/0040151 A1 | 2/2010 | Garrett | |
| 2010/0071007 A1 | 3/2010 | Meijer | |
| 2010/0071062 A1 | 3/2010 | Choyi et al. | |
| 2010/0089996 A1 | 4/2010 | Koplar | |
| 2010/0115554 A1 | 5/2010 | Drouet et al. | |

(56) References Cited

U.S. PATENT DOCUMENTS

| | | | |
|---|---|---|---|
| 2010/0122294 A1* | 5/2010 | Craner | 725/41 |
| 2010/0146560 A1 | 6/2010 | Bonfrer | |
| 2010/0153983 A1 | 6/2010 | Philmon et al. | |
| 2010/0153999 A1* | 6/2010 | Yates | 725/39 |
| 2010/0158479 A1 | 6/2010 | Craner | |
| 2010/0166389 A1 | 7/2010 | Knee et al. | |
| 2010/0169925 A1 | 7/2010 | Takegoshi | |
| 2010/0218214 A1 | 8/2010 | Fan et al. | |
| 2010/0251295 A1 | 9/2010 | Amento et al. | |
| 2010/0262986 A1 | 10/2010 | Adimatyam et al. | |
| 2010/0269144 A1 | 10/2010 | Forsman et al. | |
| 2010/0319019 A1 | 12/2010 | Zazza | |
| 2010/0322592 A1 | 12/2010 | Casagrande | |
| 2010/0333131 A1 | 12/2010 | Parker et al. | |
| 2011/0016492 A1 | 1/2011 | Morita | |
| 2011/0019839 A1 | 1/2011 | Nandury | |
| 2011/0052156 A1 | 3/2011 | Kuhn | |
| 2011/0072448 A1 | 3/2011 | Stiers et al. | |
| 2011/0109801 A1 | 5/2011 | Thomas et al. | |
| 2011/0202956 A1 | 8/2011 | Connelly et al. | |
| 2011/0206342 A1 | 8/2011 | Thompson et al. | |
| 2011/0239249 A1 | 9/2011 | Murison et al. | |
| 2011/0243533 A1 | 10/2011 | Stern et al. | |
| 2011/0252451 A1 | 10/2011 | Turgeman et al. | |
| 2011/0286721 A1 | 11/2011 | Craner | |
| 2011/0289410 A1 | 11/2011 | Paczkowski et al. | |
| 2011/0293113 A1 | 12/2011 | McCarthy | |
| 2012/0020641 A1 | 1/2012 | Sakaniwa et al. | |
| 2012/0052941 A1 | 3/2012 | Mo | |
| 2012/0060178 A1 | 3/2012 | Minakuchi et al. | |
| 2012/0106932 A1 | 5/2012 | Grevers, Jr. | |
| 2012/0131613 A1 | 5/2012 | Ellis et al. | |
| 2012/0185895 A1 | 7/2012 | Wong et al. | |
| 2012/0204209 A1 | 8/2012 | Kubo | |
| 2012/0230651 A1 | 9/2012 | Chen | |
| 2012/0246672 A1 | 9/2012 | Sridhar et al. | |
| 2012/0278837 A1 | 11/2012 | Curtis et al. | |
| 2012/0311633 A1 | 12/2012 | Mandrekar et al. | |
| 2013/0014159 A1 | 1/2013 | Wiser et al. | |
| 2013/0055304 A1 | 2/2013 | Kirby et al. | |
| 2013/0061313 A1 | 3/2013 | Cullimore et al. | |
| 2013/0074109 A1 | 3/2013 | Skelton et al. | |
| 2013/0114940 A1 | 5/2013 | Merzon et al. | |
| 2013/0128119 A1 | 5/2013 | Madathodiyil et al. | |
| 2013/0145023 A1 | 6/2013 | Li et al. | |
| 2013/0174196 A1 | 7/2013 | Herlein | |
| 2013/0194503 A1 | 8/2013 | Yamashita | |
| 2013/0263189 A1 | 10/2013 | Garner | |
| 2013/0283162 A1 | 10/2013 | Aronsson et al. | |
| 2013/0298151 A1 | 11/2013 | Leske et al. | |
| 2013/0332962 A1 | 12/2013 | Moritz et al. | |
| 2013/0346302 A1 | 12/2013 | Purves et al. | |
| 2014/0032709 A1 | 1/2014 | Saussy et al. | |
| 2014/0068675 A1 | 3/2014 | Mountain | |
| 2014/0123160 A1 | 5/2014 | van Coppenolle et al. | |
| 2014/0139555 A1 | 5/2014 | Levy | |
| 2014/0140680 A1 | 5/2014 | Jo | |
| 2014/0153904 A1 | 6/2014 | Adimatyam et al. | |
| 2014/0157327 A1 | 6/2014 | Roberts et al. | |
| 2014/0215539 A1* | 7/2014 | Chen | H04N 21/2365 725/93 |
| 2014/0282714 A1 | 9/2014 | Hussain | |
| 2014/0282741 A1 | 9/2014 | Shoykhet | |
| 2014/0282745 A1 | 9/2014 | Chipman et al. | |
| 2014/0282759 A1 | 9/2014 | Harvey et al. | |
| 2014/0294201 A1 | 10/2014 | Johnson et al. | |
| 2014/0310819 A1 | 10/2014 | Cakarel et al. | |
| 2014/0313341 A1 | 10/2014 | Stribling | |
| 2014/0325556 A1 | 10/2014 | Hoang et al. | |
| 2014/0331260 A1 | 11/2014 | Gratton | |
| 2014/0333841 A1 | 11/2014 | Steck | |
| 2014/0351045 A1 | 11/2014 | Abihssira et al. | |
| 2014/0373079 A1 | 12/2014 | Friedrich et al. | |
| 2015/0003814 A1 | 1/2015 | Miller | |
| 2015/0020097 A1 | 1/2015 | Freed et al. | |
| 2015/0040176 A1 | 2/2015 | Hybertson et al. | |
| 2015/0058890 A1 | 2/2015 | Kapa | |
| 2015/0095932 A1 | 4/2015 | Ren | |
| 2015/0118992 A1 | 4/2015 | Wyatt et al. | |
| 2015/0181279 A1 | 6/2015 | Martch et al. | |
| 2015/0249803 A1 | 9/2015 | Tozer et al. | |
| 2015/0249864 A1 | 9/2015 | Tang et al. | |
| 2015/0310725 A1 | 10/2015 | Koskan et al. | |
| 2015/0334461 A1 | 11/2015 | Yu | |
| 2016/0066020 A1 | 3/2016 | Mountain | |
| 2016/0066026 A1 | 3/2016 | Mountain | |
| 2016/0066049 A1 | 3/2016 | Mountain | |
| 2016/0066056 A1 | 3/2016 | Mountain | |
| 2016/0073172 A1 | 3/2016 | Sharples | |
| 2016/0088351 A1 | 3/2016 | Petruzzelli et al. | |
| 2016/0191147 A1 | 6/2016 | Martch | |
| 2016/0198229 A1 | 7/2016 | Keipert | |
| 2016/0309212 A1 | 10/2016 | Martch et al. | |

FOREIGN PATENT DOCUMENTS

| | | |
|---|---|---|
| EP | 2 403 239 A1 | 1/2012 |
| FR | 2 902 568 A1 | 12/2007 |
| JP | H10 322622 A | 12/1998 |
| JP | 2006-245745 A | 9/2006 |
| KR | 2004 0025073 A | 3/2004 |
| KR | 2006 0128295 A | 12/2006 |
| WO | 98/37694 A1 | 8/1998 |
| WO | 2005/059807 A2 | 6/2005 |
| WO | 2007/064987 A2 | 6/2007 |
| WO | 2007/098067 A1 | 8/2007 |
| WO | 2009/073925 A1 | 6/2009 |
| WO | 2013/016626 A1 | 1/2013 |
| WO | 2014/072742 A1 | 5/2014 |
| WO | 2014/179017 A1 | 11/2014 |
| WO | 2016/030384 | 3/2016 |
| WO | 2016/030477 A1 | 3/2016 |
| WO | 2016/038499 A1 | 3/2016 |
| WO | 2016/055761 A1 | 4/2016 |

OTHER PUBLICATIONS

U.S. Appl. No. 13/971,579, filed Aug. 20, 2013 Non Final Office Action dated Oct. 28, 2014, 35 pages.

Jin S H et al., "Intelligent broadcasting system and services for personalized semantic contents consumption", Expert Systems With Applications, Oxford, GB, vol. 31, No. 1, Jul. 1, 2006, pp. 164-173, XP024962718, ISSN: 0957-4174, DOI: 10.1016/J.ESWA.2005.09.021.

Sung Ho Jin et al., "Real-time content filtering for live broadcasts in TV terminals", Multimedia Tools and Applications, Kluwer Academic Publishers, BO, vol. 36, No. 3, Jun. 29, 2007 pp. 285-301, XP019578768, ISSN: 1573-7721.

European Search Report for EP 14197940.1 dated Apr. 28, 2015, 13 pages.

U.S. Appl. No. 14/139,420, filed Dec. 23, 2013 Non-Final Office Action dated Apr. 30, 2015, 27 pages.

U.S. Appl. No. 14/095,860, filed Dec. 3, 2013 Final Office Action dated May 1, 2015, 18 pages.

U.S. Appl. No. 14/071,613, filed Nov. 4, 2013 Non-Final Office Action dated May 18, 2015, 20 pages.

U.S. dated No. 13/971,579, filed Aug. 20, 2013 Notice of Allowance dated Feb. 27, 2015, 28 pages.

U.S. Appl. No. 13/942,451, filed Jul. 15, 2013 Final Office Action dated Apr. 30, 2015, 33 pages.

U.S. Appl. No. 13/919,702, filed Jun. 17, 2013 Non-Final Office Action dated Apr. 30, 2015, 26 pages.

Extended European Search Report for EP 11166892.7 dated Oct. 6, 2011, 7 pages.

U.S. Appl. No. 14/200,864, filed Mar. 7, 2014 Final Office Action dated Jun. 18, 2015, 36 pages.

U.S. Appl. No. 14/095,860, filed Dec. 3, 2013 Notice of Allowance dated Jul. 13, 2015, 31 pages.

Extended European Search Report for EP 14160140.1 dated Jul. 7, 2014, 7 pages.

(56) References Cited

OTHER PUBLICATIONS

U.S. Appl. No. 13/942,451, filed Jul. 15, 2013 Non Final Office Action dated Jul. 28, 2014, 27 pages.
U.S. Appl. No. 13/919,702, filed Jun. 17, 2013 Non Final Office Action dated Jun. 11, 2014, 25 pages.
U.S. Appl. No. 14/200,864, filed Mar. 7, 2014, Non-Final Office Action dated Dec. 5, 2014, 35 pages.
U.S. Appl. No. 14/095,860, filed Dec. 3, 2013 Non-Final Office Action dated Dec. 26, 2014, 45 pages.
U.S. Appl. No. 13/886,873, filed May 3, 2013, Notice of Allowance dated Oct. 24, 2014, 40 pages.
U.S. Appl. No. 13/919,702, filed Jun. 17, 2013 Final Office Action dated Nov. 18, 2014, 24 pages.
Office Action for EP 14160140.1 dated Jan. 19, 2016, 5 pages.
International Search Report and Written Opinion for PCT/EP2015/069461 dated Oct. 1, 2015, 13 pages.
International Search Report and Written Opinion for PCT/EP2015/069456 dated Oct. 5, 2015, all pages.
International Preliminary Report on Patentability for PCT/US2014/033796 dated Nov. 3, 2015, all pages.
International Search Report and Written Opinion for PCT/EP2015/069681 dated Nov. 23, 2015, 12 pages.
International Search Report and Written Opinion for PCT/GB2015/052570 dated Dec. 11, 2015, 13 pages.
U.S. Appl. No. 14/470,279, filed Aug. 27, 2014, Final Office Action dated Jan. 22, 2016, 25 pages.
U.S. Appl. No. 14/591,474, filed Jan. 7, 2015, Non-Final Office Action dated Feb. 12, 2016, 32 pages.
U.S. Appl. No. 14/494,079, filed Sep. 23, 2014, Preinterview first office action dated Feb. 10, 2016, 6 pages.
U.S. Appl. No. 14/095,860, filed Dec. 3, 2013 Notice of Allowance dated Oct. 19, 2015, 14 pages.
U.S. Appl. No. 13/942,451, filed Jul. 15, 2013 Non Final Office Action dated Jan. 8, 2016, 41 pages.
U.S. Appl. No. 13/919,702, filed Jun. 17, 2013 Final Office Action dated Dec. 31, 2015, 30 pages.
U.S. Appl. No. 14/071,613, filed Nov. 4, 2013 Final Office Action dated Oct. 8, 2015, 11 pages.
U.S. Appl. No. 14/470,392, filed Aug. 27, 2014 Non Final Office Action dated Nov. 5, 2015, 31 pages.
U.S. Appl. No. 14/470,415, filed Aug. 27, 2014 Non Final Office Action dated Nov. 18, 2015, 28 pages.
U.S. Appl. No. 14/470,248, filed Aug. 27, 2014, Final Office Action dated Feb. 16, 2016, 26 pages.
U.S. Appl. No. 14/470,248, filed Aug. 27, 2014, Preinterview first office action mailed Sep. 4, 2015, 22 pages.
U.S. Appl. No. 14/470,279, filed Aug. 27, 2014, Preinterview first office action dated Aug. 26, 2015, 23 pages.
U.S. Appl. No. 14/479,007, filed Sep. 5, 2014, Non-Final Office Action dated Sep. 1, 2015, 44 pages.
U.S. Appl. No. 14/200,864, filed Mar. 7, 2014 Non-Final Office Action dated Feb. 18, 2016, 61 pages.
U.S. Appl. No. 14/479,007, filed Sep. 5, 2014, Final Office Action dated Feb. 22, 2016, 37 pages.
U.S. Appl. No. 14/139,420, filed Dec. 23, 2013 Notice of Allowance dated Mar. 31, 2016, 37 pages.
U.S. Appl. No. 14/470,392, filed Aug. 27, 2014 Final Office Action dated Mar. 4, 2016, all pages.
U.S. Appl. No. 14/470,415, filed Aug. 27, 2014 Final Office Action dated Mar. 3, 2016, all pages.
International Search Report and Written Opinion for PCT/GB2015/052456 dated Jun. 13, 2016, all pages.
U.S. Appl. No. 14/470,248, filed Aug. 27, 2014, Non Final Office Action dated Jul. 25, 2016, all pages.
U.S. Appl. No. 14/470,279, filed Aug. 27, 2014, Non Final Office Action dated Jul. 19, 2016, all pages.
U.S. Appl. No. 14/479,007, filed Sep. 5, 2014, Non-Final Office Action dated Jul. 27, 2016, 37 pages.
U.S. Appl. No. 13/942,451, filed Jul. 15, 2013 Final Office Action dated Jun. 22, 2016, all pages.
U.S. Appl. No. 13/919,702, filed Jun. 17, 2013 Non Final Office Action dated Jun. 30, 2016, all pages.
U.S. Appl. No. 14/470,392, filed Aug. 27, 2014 Non-Final Office Action dated Aug. 5, 2016, all pages.
U.S. Appl. No. 14/470,415, filed Aug. 27, 2014 Non Final Office Action dated Jul. 29, 2016, all pages.
U.S. Appl. No. 14/200,864, filed Mar. 7, 2014 Notice of Allowance dated Sep. 15, 2016, all pages.
U.S. Appl. No. 14/470,248, filed Aug. 27, 2014 Final Office Action dated Dec. 9, 2016, all pages.
U.S. Appl. No. 14/470,279, filed Aug. 27, 2014 Final Office Action dated Dec. 9, 2016, all pages.
U.S. Appl. No. 14/591,474, filed Jan. 7, 2015, Non-Final Office Action dated Dec. 16, 2016, 32 pages.
U.S. Appl. No. 15/195,527, filed Jun. 28, 2016, Non-Final Rejection dated Sep. 30, 2016, all pages.
U.S. Appl. No. 13/942,451, filed Jul. 15, 2013 Non Final Office Action dated Oct. 25, 2016, all pages.
U.S. Appl. No. 13/919,702, filed Jun. 17, 2013 Final Office Action dated Oct. 28, 2016, all pages.

\* cited by examiner

CUSTOMIZED VIDEO MOSAIC

CROSS REFERENCES TO RELATED APPLICATION

This Application is related to copending U.S. patent application Ser. No. 14/139,420, filed Dec. 23, 2013, entitled "Mosaic Focus Control," which is hereby incorporated by reference for all purposes.

BACKGROUND

"What's on TV?" is a phrase echoed across multitudes of households on a regular basis. In recent years, television service providers have incorporated electronic programming guides (EPGs) into their service offerings. Such EPG arrangements can allow a user to browse through current and future television listings on television channels. While such EPG arrangements can offer users access to large amounts of information about content, a user may desire an alternate presentation arrangement for determining available content.

SUMMARY

In some embodiments, a television receiver configured to output a customized video mosaic is presented. The television receiver may include one or more tuners. The television receiver may include one or more processors. The television receiver may include a memory communicatively coupled with and readable by the one or more processors. The memory may have stored therein processor-readable instructions which, when executed by the one or more processors, may cause the one or more processors, based on received user input, to determine the customized video mosaic is to be output for presentation. The instructions may cause the one or more processors to determine a plurality of television channels to be presented as part of the customized video mosaic. The instructions may cause the one or more processors to tune one or more tuners of the one or more tuners based on the determined plurality of television channels to be presented. The instructions may cause the one or more processors to output for presentation the plurality of television channels to a presentation device, wherein each television channel of the plurality of television channels are presented by the presentation device as live video simultaneously as part of the customized video mosaic.

Embodiments of such a television receiver may include one or more of the following: The processor-readable instructions that cause the one or more processors to tune one or more tuners of the one or more tuners based on the determined plurality of television channels to be presented may include processor-readable instructions which, when executed, cause the one or more processors to tune at least one tuner to a preview transponder stream. The preview transponder stream may include reduced resolution video streams of television channels distributed in higher resolution via a plurality of television channel transponder streams. The plurality of television channels output for presentation to the presentation device may include one or more reduced resolution video streams of television channels. The preview transponder stream may include at least thirty reduced resolution video streams of television channels distributed in higher resolution via the plurality of television channel transponder streams. The instructions may cause the one or more processors to receive user input selecting a reduced resolution video stream from the customized video mosaic. The instructions may cause the one or more processors to determine a television channel transponder stream that corresponds to the reduced resolution video stream. The instructions may cause the one or more processors to tune a tuner of the one or more tuners to the television channel transponder stream. The instructions may cause the one or more processors to output the television channel from the television channel transponder stream that corresponds to the reduced resolution video stream. At least seven television channels may be output as part of the customized video mosaic simultaneously. The processor-readable instructions that cause the one or more processors to determine the plurality of television channels to be presented as part of the customized video mosaic comprise processor-readable instructions which, when executed, may cause the one or more processors to determine the plurality of television channels to be presented as part of the customized video mosaic based upon a selection of a user profile. The instructions may cause the one or more processors to, prior to determining the customized video mosaic is to be output for presentation, identify a television program on a television channel to record based on the user profile. The instructions may cause the one or more processors to record the television program on the television channel at a first resolution. The instructions may cause the one or more processors to output for presentation the recorded television program as part of the customized video mosaic at a second resolution, wherein the second resolution is less than the first resolution. The instructions may cause the one or more processors to, prior to determining the customized video mosaic is to be output for presentation, receive a timer from a user. The instructions may cause the one or more processors to record a television program on a television channel at a first resolution based on the timer. The instructions may cause the one or more processors to record a reduced resolution preview clip corresponding to the television program. The instructions may cause the one or more processors to output for presentation the reduced resolution preview clip as part of the customized video mosaic. The processor-readable instructions that cause the one or more processors to determine the plurality of television channels to be presented as part of the customized video mosaic based upon the selected user profile comprise processor-readable instructions which, when executed, may cause the one or more processors to identify a category of television programming indicated by the user profile as preferred. The instructions may cause the one or more processors to receive user input selecting a category of television programming to link with the user profile.

In some embodiments, a method for outputting a customized video mosaic is presented. The method may include determining, by a television receive, the customized video mosaic is to be output for presentation based on received user input. The method may include determining, by the television receiver, a plurality of television channels to be presented as part of the customized video mosaic. The method may include tuning, by the television receiver, at least one tuner of the one or more tuners based on the determined plurality of television channels to be presented. The method may include outputting, by the television receiver, for presentation the plurality of television channels to a presentation device, wherein each television channel of the plurality of television channels are presented by the presentation device as live video simultaneously as part of the customized video mosaic.

Embodiments of such a method may include one or more of the following: Tuning at least one tuner of the one or more tuners based on the determined plurality of television channels to be presented may include tuning the at least one tuner to a preview transponder stream. The preview transponder stream may include reduced resolution video streams of television channels distributed in higher resolution via a plurality of television channel transponder streams. The plurality of television channels output for presentation to the presentation device may include one or more reduced resolution video streams of television channels. The preview transponder stream may include at least thirty reduced resolution video streams of television channels distributed in higher resolution via the plurality of television channel transponder streams. The method may include receiving, by the television receiver, user input selecting a reduced resolution video stream from the customized video mosaic. The method may include determining, by the television receiver, a television channel transponder stream that corresponds to the reduced resolution video stream. The method may include tuning, by the television receiver, a tuner of the one or more tuners to the television channel transponder stream. The method may include outputting, by the television receiver, the television channel from the television channel transponder stream that corresponds to the reduced resolution video stream. At least seven television channels may be output as part of the customized video mosaic simultaneously. Determining the plurality of television channels to be presented as part of the customized video mosaic may include determining, by the television receiver, the plurality of television channels to be presented as part of the customized video mosaic based upon a selection of a user profile. The method may include, prior to determining the customized video mosaic is to be output for presentation, identifying, by the television receiver, a television program on a television channel to record based on the user profile. The method may include recording, by the television receiver, the television program on the television channel at a first resolution. The method may include outputting, by the television receiver, for presentation the recorded television program as part of the customized video mosaic at a second resolution, wherein the second resolution is less than the first resolution. The method may include, prior to determining the customized video mosaic is to be output for presentation, receiving, by the television receiver, definition of a timer from a user. The method may include recording, by the television receiver, a television program on a television channel at a first resolution based on the timer. The method may include recording, by the television receiver, a reduced resolution preview clip corresponding to the television program. The method may include outputting, by the television receiver, for presentation the reduced resolution preview clip as part of the customized video mosaic. Determining the plurality of television channels to be presented as part of the customized video mosaic based upon the selected user profile may include identifying a category of television programming indicated by the user profile as preferred.

In some embodiments, a non-transitory computer-readable medium for outputting a customized video mosaic may be presented. The non-transitory computer-readable medium, comprising processor-readable instructions configured to cause one or more processors to, based on received user input, determine the customized video mosaic is to be output for presentation. The instructions may cause the one or more processors to determine a plurality of television channels to be presented as part of the customized video mosaic. The instructions may cause the one or more processors to tune one or more tuners of the one or more tuners based on the determined plurality of television channels to be presented. The instructions may cause the one or more processors to output for presentation the plurality of television channels to a presentation device, wherein each television channel of the plurality of television channels are presented by the presentation device as live video simultaneously as part of the customized video mosaic.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

When a user turns on a television and an associated television receiver, typically the last television channel viewed is displayed. If the user desires to learn about what television shows are currently being broadcast, the user may activate the display of an electronic programming guide (EPG). An EPG may present programming information about what various television channels are currently broadcasting and what these television channels will be broadcasting in the future. Typically, an EPG is a grid that includes time on the horizontal axis, channel names and/or numbers on the vertical axis, and television program names within the grid. If the user desires to see what recorded content is available at the television receiver, the user may access a digital video recorder (DVR) menu or display screen. If the user desires to see what content is available on-demand, yet another menu or display screen may be accessed.

In embodiments detailed herein, a customized video mosaic (CVM) may be used to present programming information to a user. Such a CVM may present video from multiple sources simultaneously. These sources may include: multiple television channels, content recorded based on user-defined timers, content recorded based on service provider-defined timers, content recorded based on predictive analysis, and/or on-demand content. Content recorded on a predictive analysis may be referred to as being based on television receiver-defined timers which are created based on a user profile. The CVM may be customized based on a currently-active user profile. For instance, a user may provide self-identification.

A CVM may be displayed as a "start-up" screen, such as when the television receiver enters a powered on mode. By viewing the CVM, a user can view video of multiple pieces of content simultaneously. By selecting a particular piece of content from the CVM, playback of the selected content may commence in a full screen mode. In some embodiments, the user may be permitted to navigate among tiles of the CVM, which results in the audio for the highlighted tile within the CVM being output. Along with the video of each tile of the CVM playing simultaneously, text may be presented in relation to some or all of the tiles that indicates: the source (e.g., broadcast television, on-demand content), the television channel (if applicable), the runtime, the scheduled start and stop time, and/or a synopsis (or other programming information, such as ratings).

Figure 1:
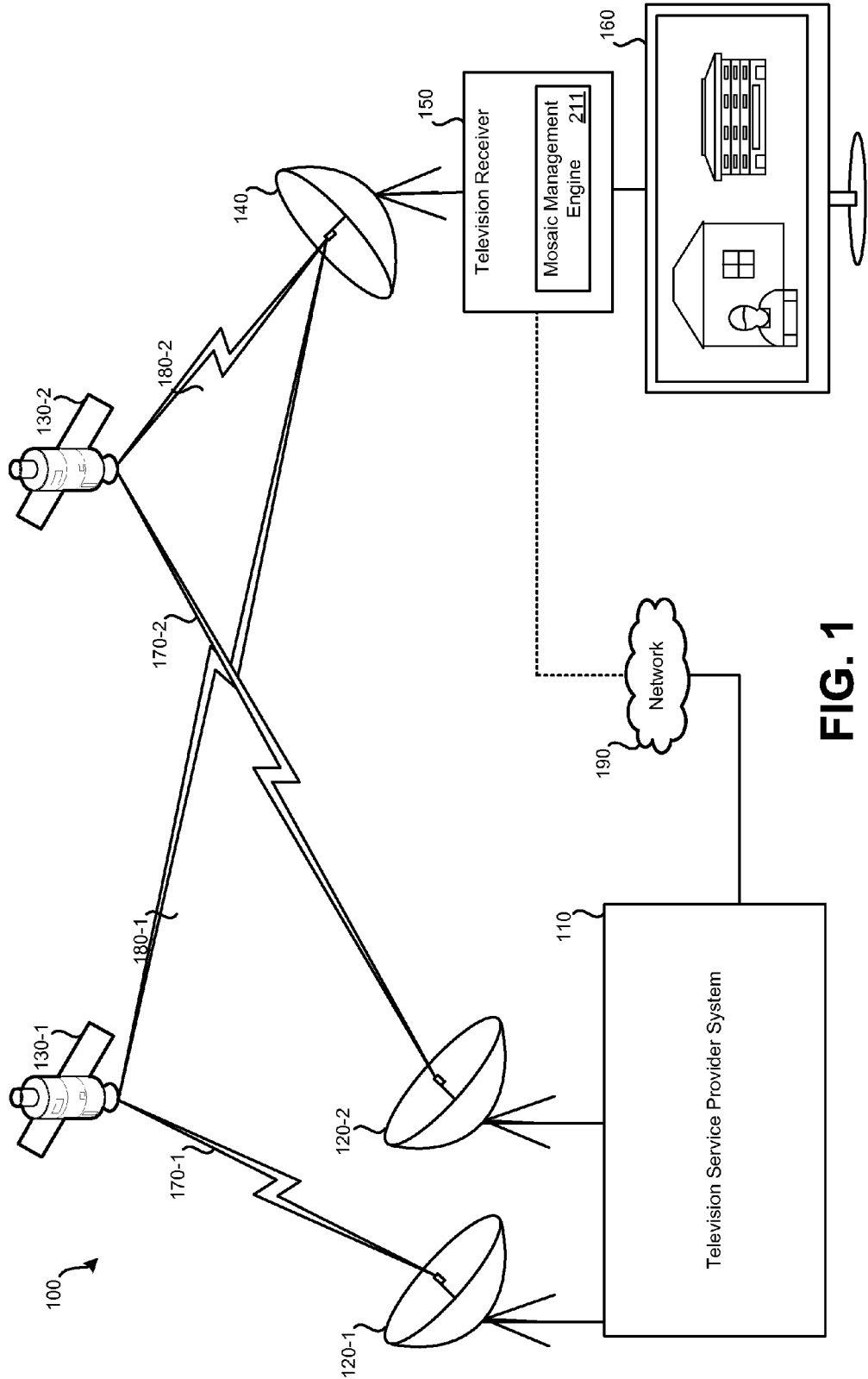
FIG. 1 illustrates an embodiment of a satellite television distribution system.

Such a CVM may be implemented in a satellite based television system. FIG. 1 illustrates an embodiment of a satellite television distribution system 100. Satellite television distribution system 100 may include: television service provider system 110, satellite transmitter equipment 120, satellites 130, satellite dish 140, television receiver 150, and display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions) instances of user equipment may receive television signals from television service provider system 110 via satellites 130.

Television service provider system 110 and satellite transmitter equipment 120 may be operated by a television service provider. A television service provider may distribute television channels, on-demand programming, programming information, and/or other content/services to users. Television service provider system 110 may receive feeds of one or more television channels from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 120 (120-1, 120-2) may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from transponder streams 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed.

Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 130-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Each transponder stream may be able to carry a finite amount of data. As such, the number of television channels that can be included in a particular transponder stream may be at least partially dependent on the resolution of the video of the television channel. For example, a transponder stream may be able to carry seven or eight television channels at a high resolution, but may be able to carry dozens, fifty, a hundred, two hundred, or some other number of television channels at reduced resolutions.

Satellite dish 140 may be a piece of user equipment that is used to receive transponder streams from one or more satellites, such as satellites 130. Satellite dish 140 may be provided to a subscriber for use on a subscription basis to receive television channels provided by the television service provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time.

Figure 2:
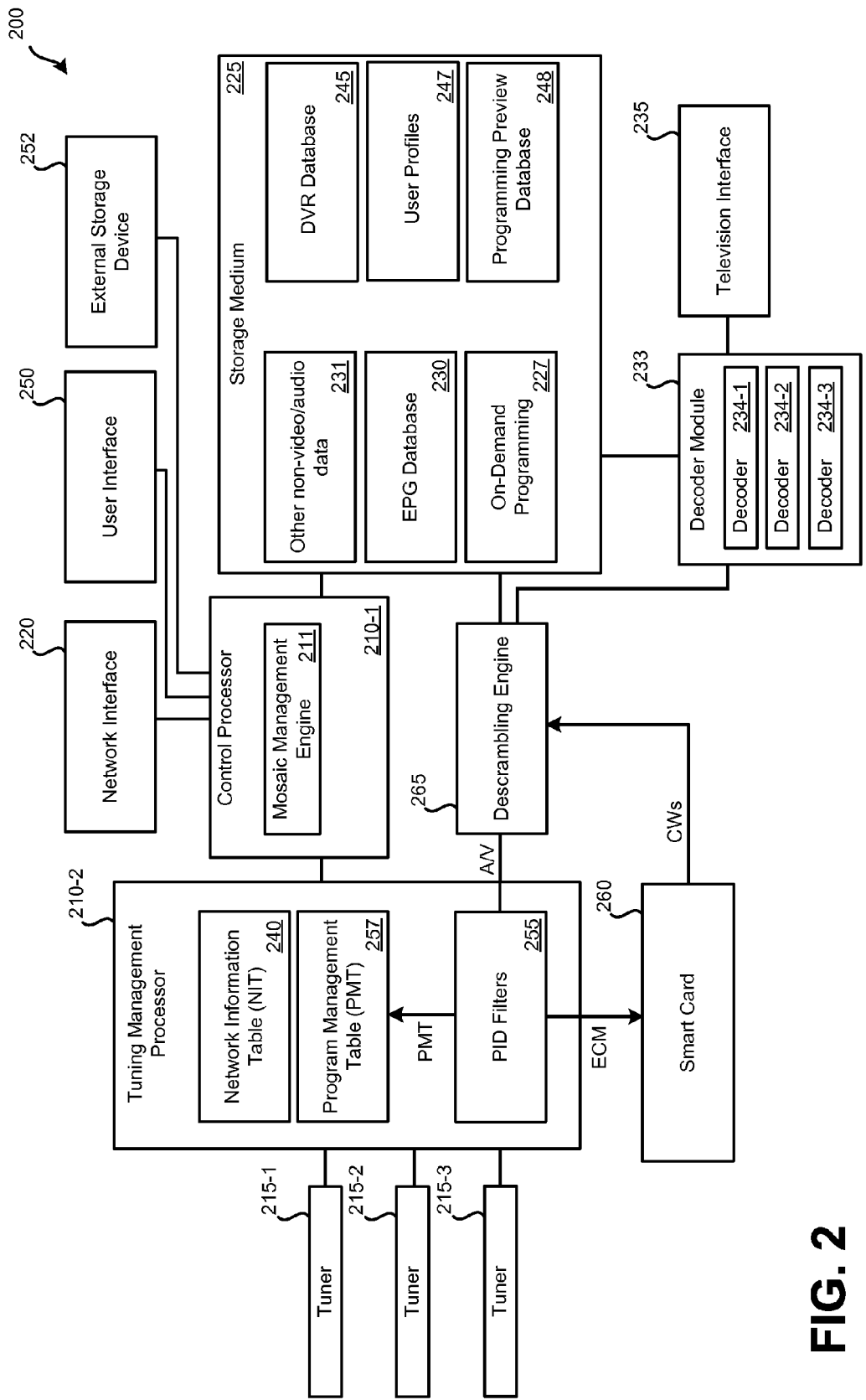
FIG. 2 illustrates an embodiment of a television receiver configured to present a customized video mosaic.

In communication with satellite dish 140 may be one or more television receivers. Television receivers may be configured to decode signals received from satellites 130 via satellite dish 140 for output and presentation via a display device, such as display device 160. A television receiver may be incorporated as part of a television or may be part of a separate device, commonly referred to as a set-top box (STB). Television receiver 150 may decode signals received via satellite dish 140 and provide an output to display device 160. FIG. 2 provides additional detail of various embodiments of a television receiver. A television receiver is defined to include set-top boxes (STBs) and also circuitry having similar functionality that may be incorporated with another device. For instance, circuitry similar to that of a television receiver may be incorporated as part of a television. As such, while FIG. 1 illustrates an embodiment of television receiver 150 as separate from display device 160, it should be understood that, in other embodiments, similar functions may be performed by a television receiver integrated with display device 160.

Display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a first group of television channels, while uplink signal 170-2 contains a second group of television channels. Each of these television channels may be scrambled such that unauthorized persons are prevented from accessing the television channels.

Transponder stream 180-1 represents a transponder stream signal between satellite 130-1 and satellite dish 140. Transponder stream 180-2 represents a transponder stream signal between satellite 130-2 and satellite dish 140. Each of transponder streams 180 may contain one or more different television channels, which may be at least partially scrambled. For example, transponder stream 180-1 may be a first transponder stream containing a first group of television channels, while transponder stream 180-2 may be a second transponder stream containing a different group of television channels. When a television channel is received as part of a transponder stream and is decoded and output to display device 160 (rather than first storing the television channel to a storage medium as part of DVR functionality then later outputting the television channel from the storage medium), the television channel may be considered to be viewed "live."

FIG. 1 illustrates transponder stream 180-1 and transponder stream 180-2 being received by satellite dish 140 and distributed to television receiver 150. For a first group of television channels, satellite dish 140 may receive transponder stream 180-1 and for a second group of channels, transponder stream 180-2 may be received. Television receiver 150 may decode the received transponder streams. As such, depending on which television channels are desired to be presented or stored, various transponder streams from various satellites may be received, descrambled, and decoded by television receiver 150.

Network 190 may serve as a secondary communication channel between television service provider system 110 and television receiver 150. However, in many instances, television receiver 150 may be disconnected from network 190 (for reasons such as because television receiver 150 is not configured to connect to network 190 or a subscriber does not desire or cannot connect to network 190). As such, the connection between network 190 and television receiver 150 is represented by a dotted line. Via such a secondary communication channel, bidirectional exchange of data may occur. As such, data may be transmitted to television service provider system 110 from television receiver 150 via network 190. Data may also be transmitted from television service provider system 110 to television receiver 150 via network 190. Network 190 may be the Internet. While audio and video services may be provided to television receiver 150 via satellites 130, feedback from television receiver 150 to television service provider system 110 may be transmitted via network 190.

FIG. 2 illustrates an embodiment of television receiver 200. Television receiver 200 may be configured to output for presentation a CVM. Television receiver 200 may be in the form of a separate device configured to be connected with a display device, such as a television. Embodiments of television receiver 200 can include set top boxes (STBs). As previously noted, in addition to being in the form of an STB, a television receiver may be incorporated as part of another device, such as a television or other form of display device. For example, a television may have an integrated television receiver (which does not involve an external STB being coupled with the television).

Television receiver 200 may represent television receiver 150 of FIG. 1 and may be in the form of an STB that outputs video and/or audio to a display device, such as a television. Television receiver 200 may be incorporated as part of a television, such as display device 160 of FIG. 1. Television receiver 200 may include: processors 210 (which may include control processor 210-1, tuning management processor 210-2, and possibly additional processors), tuners 215, network interface 220, non-transitory computer-readable storage medium 225, electronic programming guide (EPG) database 230, television interface 235, networking information table (NIT) 240, digital video recorder (DVR) database 245 (which may include provider-managed television programming storage and/or user-defined television programming), on-demand programming 227, user profiles 247, programming preview database 248, user interface 250, external storage device 252, smartcard 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210-2. Further, functionality of components may be spread among additional components; for example, PID (packet identifier) filters 255 may be handled by separate hardware from program management table 257.

Processors 210 may include one or more specialized and/or general-purpose processors configured to perform processes such as tuning to a particular channel, accessing and displaying EPG information from EPG database 230, and/or receiving and processing input from a user. For example, processors 210 may include one or more processors dedicated to decoding video signals from a particular format, such as MPEG, for output and display on a television and for performing decryption. It should be understood that the functions performed by various modules of FIG. 2 may be performed using one or more processors. As such, for example, functions of descrambling engine 265 may be performed by control processor 210-1.

Control processor 210-1 may communicate with tuning management processor 210-2. Control processor 210-1 may control the recording of television channels based on timers stored in DVR database 245. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to decoder module 233 for output to a display device. Control processor 210-1 may also communicate with network interface 220 and user interface 250. Control processor 210-1 may handle incoming data from network interface 220 and user interface 250. Additionally, control processor 210-1 may be configured to output data via network interface 220.

Control processor 210-1 may include a mosaic management engine 211. Embodiments of a mosaic management engine 211 are described in relation to FIG. 3.

Tuners 215 may include one or more tuners used to tune to transponders that include broadcasts of one or more television channels. In the illustrated embodiment of television receiver 200, three tuners are present (tuner 215-1, tuner 215-2, and tuner 215-3). In other embodiments, two or more than three tuners may be present, such as four, six, or eight tuners. Each tuner contained in tuners 215 may be capable of receiving and processing a single transponder stream from a satellite transponder at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 which frequencies are to be tuned to.

Network interface 220 may be used to communicate via an alternate communication channel with a television service provider, if such communication channel is available. The primary communication channel may be via satellite (which may be unidirectional to television receiver 200) and the alternate communication channel (which may be bidirectional) may be via a network, such as the Internet. Referring back to FIG. 1, television receiver 150 may be able to communicate with television service provider system 110 via a network, such as the Internet. This communication may be bidirectional: data may be transmitted from television receiver 150 to television service provider system 110 and from television service provider system 110 to television receiver 150. Referring back to FIG. 2, network interface 220 may be configured to communicate via one or more networks, such as the Internet, to communicate with television service provider system 110 of FIG. 1. Information may be transmitted and/or received via network interface 220. For instance, instructions (e.g., regarding subscription portability) from a television service provider may also be received via network interface 220, if connected with the Internet. Network interface 220 may be used to provide a confirmation to a television service provider that instructions received from the television service provider have indeed been executed.

Storage medium 225 may represent one or more non-transitory computer-readable storage mediums. Storage medium 225 may include memory and/or a hard drive. Storage medium 225 may be used to store information received from one or more satellites and/or information received via network interface 220. Storage medium 225 may store information related to EPG database 230, other non-video/audio data 231, DVR database 245, user profiles 247, programming preview database 248, and/or on-demand programming 227. Recorded television programs may be stored using storage medium 225 as part of DVR database 245. Storage medium 225 may be partitioned or otherwise divided (such as into folders) such that predefined amounts of storage medium 225 are devoted to storage of television programs recorded due to user-defined timers and stored television programs recorded due to provider-defined timers.

EPG database 230 may store information related to television channels and the timing of programs appearing on such television channels. EPG database 230 may be stored using storage medium 225, which may be a hard drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220 and/or via satellites, such as satellites 130 of FIG. 1 via tuners 215. For instance, updates to EPG database 230 may be received periodically via satellite. EPG database 230 may serve as an interface for a user to control DVR functions of television receiver 200, and/or to enable viewing and/or recording of multiple television channels simultaneously.

The network information table (NIT) 240 may store information used by television receiver 200 to access various television channels. NIT 240 may be stored locally by a processor, such as tuning management processor 210-2 and/or by storage medium 225. Information used to populate NIT 240 may be received via satellite (or cable) through tuners 215 and/or may be received via network interface 220 from the television service provider. As such, information present in NIT 240 may be periodically updated. In some embodiments, NIT 240 may be locally-stored by television receiver 200 using storage medium 225. Generally, NIT 240 may store information about a service provider network, such as a satellite-based service provider network. Information that may be present in NIT 240 may include: television channel numbers, satellite identifiers (which may be used to ensure different satellites are tuned to for reception of timing signals), frequency identifiers and/or transponder identifiers for various television channels. In some embodiments, NIT 240 may contain additional data or additional tables may be stored by the television receiver. For example, while specific audio PIDs and video PIDs may not be present in NIT 240, a channel identifier may be present within NIT 240 which may be used to look up the audio PIDs and video PIDs in another table, such as a program map table (PMT). In some embodiments, a PID associated with the data for the PMT is indicated in a separate table, program association table (PAT), which is not illustrated in FIG. 2. A PAT may be stored by the television receiver in a similar manner to the NIT. For example, a PMT may store information on audio PIDs, and/or video PIDs. A PMT stores data on ECM (entitlement control message) PIDs for television channels that are transmitted on a transponder frequency. If, for a first television channel, multiple television channels are to be tuned to, NIT 240 and/or PMT 257 may indicate a second television channel that is to be tuned to when a first channel is tuned to.

Based on information in the NIT, it may be possible to determine the proper satellite and transponder to which to tune for a particular television channel. In some embodiments, the NIT may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

While a large portion of storage space of storage medium 225 is devoted to storage of television programming, a portion may be devoted to storage of non-audio/video data, such as EPG database 230 and other non-video/audio data 231. This "other" data may permit television receiver 200 to function properly. In some embodiments, at least ten gigabytes are allocated to such other data. For example, if NIT 240 is stored by storage medium 225, it may be part of other non-video/audio data 226.

User profiles 247 may include stored user preferences. For example, a user may specify a preferred category of television programming, such as: sports, news, movies, sitcoms, reality, etc. The user may also specify whether they prefer broadcast ("live") television, on-demand programming, or recorded television programming (via user or provider defined timers). In some embodiments, data for a user's profile may be defined based on measured viewing habits, such as which television channels and/or categories of television programming does the user watch. User profiles 247 may specify which television programs were recorded based on timers set by the user associated with a specific user profile. User profiles 247 may include profiles for multiple users or may include a single profile for the television receiver in general. In some embodiments, a user is permitted to select which user profile of user profiles 247 is active. For instance, a user can log on to television receiver 200.

Programming Preview Database 248 may be used to store lower resolution (compared to full (e.g., high resolution, standard resolution) definition television programming) preview clips that are used for presentation as part of a CVM. Programming Preview Database 248 may store preview clips of a particular length, such as one minute. Since a CVM will likely have multiple preview clips playing at the same time, each video can have a reduced resolution since each video will not occupy an entire screen of a display device. In some embodiments, preview clips of television programming are stored to programming preview database 248 for later playback. Preview clips may be stored for broadcast television programming, recorded content (regardless of whether recorded based on a user timer, a provider defined timer, or a timer created based on analysis of a user profile), and on-demand content. In some embodiments, preview clips are recorded only when the corresponding full resolution television programming is recorded.

The preview clip for a television program may be transmitted as part of the transponder stream used to receive the television program. For instance, the preview clip may have audio and video packets transmitted using the same transponder stream as the full resolution television program. Such packets of the preview clip may be interspersed with packets corresponding to the full resolution television program. In some embodiments, the preview clip corresponds to the portion of the full resolution television program currently being broadcast (that is, a frame of the preview clip represents the same content, at a lower resolution, of the current frame of the full resolution television program). In other embodiments, the preview clip may represent a trailer for the full resolution television program. The packets corresponding to the preview clip may be associated with different PIDs than the full resolution television program. The PIDs of the preview clip may be identified as linked with the television channel on which the full resolution television program is being received based on entries in NIT 240, PMT 257, and/or some other locally-stored table. Therefore, a preview clip at a low resolution can be recorded to programming preview database 248 by tuning to the same transponder stream as the television channel currently broadcasting the corresponding full resolution television program.

In some embodiments, rather than transmitting the preview clip using the same transponder stream as the full resolution television program, the preview clip may be transmitted as part of another transponder stream. For instance, a particular transponder stream may be dedicated to carrying preview clips of currently broadcast television channels. Therefore, for at least a portion of the currently broadcast television channels, such as 50, 100, 200, or 300 television channels (or any variation in between), preview clips can be obtained by tuning a single tuner of tuners 215 to the preview clip transponder stream. If, for example, the preview clip transponder includes preview clips for the one hundred most popular television channels, it may be possible to populate multiple or all tiles of a CVM by tuning a single tuner to the preview clip transponder stream. Further, since the preview clips are already of a reduced-resolution that is appropriate for presentation as a tile that does not occupy an entire display screen, the amount of processing needing to be performed by decoder module 233 may be decreased. In embodiments involving a separate preview clip transponder stream, when a timer is used to record the full resolution television program, if an additional tuner of tuners 215 is available, the additional tuner may record the corresponding preview clip. To do so, the television receiver may determine the television channel on which the television program being recorded is being broadcast, the television channel may be used to determine PIDs corresponding to the correct preview clip on the preview clip transponder stream. In some embodiments, preview clips are transmitted on both the transponder stream carrying the full resolution television program and the preview clip transponder stream. Such an arrangement may permit the preview clip on the same transponder stream to be recorded if the full resolution television program is also being recorded while only utilizing a single tuner; if the full resolution television program is not being recorded, the preview clip can be received via the preview clip transponder stream using the same tuner used to receive other preview clips.

Decoder module 233 may serve to convert encoded video and audio into a format suitable for output to a display device. For instance, decoder module 233 may receive MPEG video and audio from storage medium 225 or descrambling engine 265 to be output to a television. MPEG video and audio from storage medium 225 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or descrambling engine 265 simultaneously. For instance, each of decoders 234 within decoder module 233 may be able to only decode a single television channel at a time. While decoder module 233 is illustrated as having three decoders 234 (decoder 234-1, decoder 234-2, and decoder 234-3), in other embodiments, a greater or fewer number of decoders may be present in television receiver 200. A decoder may be able to only decode a single high definition television program at a time. However, a decoder may be able to decode multiple preview clips at the same time. Therefore, if nine preview clips are being presented as tiles in a CVM simultaneously, only one or two decoders of decoders 234 may be necessary to decode the encoded preview clips.

Television interface 235 may serve to output a signal to a television (or another form of display device) in a proper format for display of video and playback of audio. As such, television interface 235 may output one or more television channels, stored television programming from storage medium 225 (e.g., television programs from DVR database 245, television programs from on-demand programming 230 and/or information from EPG database 230) to a television for presentation. Television interface 235 may also serve to output a CVM.

Digital Video Recorder (DVR) functionality may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television channels. DVR database 245 may store timers that are used by control processor 210-1 to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 200 via the television provider's network. For example, referring to satellite television distribution system 100 of FIG. 1, in a satellite-based television service provider system, data necessary to create the provider-defined timers at television receiver 150 may be received via satellite.

As an example of DVR functionality of television receiver 200 being used to record based on provider-defined timers, a television service provider may configure television receiver 200 to record television programming on multiple, predefined television channels for a predefined period of time, on predefined dates. For instance, a television service provider may configure television receiver 200 such that television programming may be recorded from 7 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 225 for provider-managed television programming storage.

DVR Database 245 may also store television programming that is recorded based on analysis of user profiles 247. For instance, if a user frequently watches and/or records sports, a major sporting event may be selected by control processor 210-1 for recording based on the user's profile. The day of the week, channel, and/or time of previously set timers may also be used to record television programming. For instance, if a user has previously set a timer to record television channel five at 8 PM on Thursdays, control processor 210-1 may set a timer for this same day of the week, channel, and time for some point in the future (even though the user has not specifically selected it).

On-demand programming 227 may represent additional television programming stored by storage medium 225. On-demand programming 227 may include television programming that was not recorded to storage medium 225 via a timer (either user- or provider-defined). Rather, on-demand programming is programming provided to the television receiver directly for storage by the television receiver and for later presentation to one or more users. On-demand programming may not be user-selected. As such, the television programming stored to on-demand programming storage 227 may be the same for each television receiver of a television service provider.

User interface 250 may include a remote control (physically separate from television receiver 200) and/or one or more buttons on television receiver 200 that allow a user to interact with television receiver 200. User interface 250 may be used to select a television channel for viewing, view information from EPG database 230, and/or program a timer stored to DVR database 245, wherein the timer is used to control the DVR functionality of control processor 210-1. In some embodiments, it may be possible to load some or all of preferences to a remote control. As such, the remote control can serve as a backup storage device for the preferences.

Referring back to tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which, in combination with NIT 240 and/or PMT 257, can be determined to be associated with a particular television channel. Particular data packets, referred to as entitlement control messages (ECMs), may be periodically transmitted. ECMs may be associated with another PID and may be encrypted; television receiver 200 may use decryption engine 261 of smartcard 260 to decrypt ECMs. Decryption of an ECM may only be possible if the user has authorization to access the particular television channel associated with the ECM. When an ECM is determined to correspond to a television channel being stored and/or displayed, the ECM may be provided to smartcard 260 for decryption.

When smartcard 260 receives an encrypted ECM, smartcard 260 may decrypt the ECM to obtain some number of control words. In some embodiments, from each ECM received by smartcard 260, two control words are obtained. In some embodiments, when smartcard 260 receives an ECM, it compares the ECM to the previously received ECM. If the two ECMs match, the second ECM is not decrypted because the same control words would be obtained. In other embodiments, each ECM received by smartcard 260 is decrypted; however, if a second ECM matches a first ECM, the outputted control words will match; thus, effectively, the second ECM does not affect the control words output by smartcard 260. Smartcard 260 may be permanently part of television receiver 200 or may be configured to be inserted and removed from television receiver 200.

Tuning management processor 210-2 may be in communication with tuners 215 and control processor 210-1. Tuning management processor 210-2 may be configured to receive commands from control processor 210-1. Such commands may indicate when to start/stop recording a television channel and/or when to start/stop causing a television channel to be output to a television. Tuning management processor 210-2 may control tuners 215. Tuning management processor 210-2 may provide commands to tuners 215 that instruct the tuners which satellite, transponder, and/or frequency to tune to. From tuners 215, tuning management processor 210-2 may receive transponder streams of packetized data. As previously detailed, some or all of these packets may include a PID that identifies the content of the packet.

Tuning management processor 210-2 may be configured to create one or more PID filters 255 that sort packets received from tuners 215 based on the PIDs. When a tuner is initially tuned to a particular frequency (e.g., to a particular transponder of a satellite), a PID filter may be created based on the PMT data. The PID filter created, based on the PMT data packets, may be known because it is stored as part of NIT 240 or another table, such as a program association table (PAT). From the PMT data packets, PMT may be constructed by tuning management processor 210-2.

PID filters 255 may be configured to filter data packets based on PIDs. In some embodiments, PID filters 255 are created and executed by tuning management processor 210-2. For each television channel to be output for presentation or recorded, a separate PID filter may be configured. In other embodiments, separate hardware may be used to create and execute such PID filters. Depending on a television channel selected for recording/viewing, a PID filter may be created to filter the video and audio packets associated with the television channel (based on the PID assignments present in PMT 257). For example, if a transponder data stream includes multiple television channels, data packets corresponding to a television channel that is not desired to be stored or displayed by the user may be ignored by PID filters 255. As such, only data packets corresponding to the one or more television channels desired to be stored and/or displayed may be filtered and passed to either descrambling engine 265 or smartcard 260; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as updates to NIT 240, may be appropriately routed by PID filters 255. At a given time, one or multiple PID filters may be executed by tuning management processor 210-2.

Descrambling engine 265 may use the control words output by smartcard 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by smartcard 260 to be used for successful descrambling may be indicated by a scramble control identifier present within the data packet containing the scrambled video or audio. Descrambled video and/or audio may be output by descrambling engine 265 to storage medium 225 for storage (in DVR database 245) and/or to decoder module 233 for output to a television or other presentation equipment via television interface 235.

External storage device 252 may represent an external, detachable computer-readable non-transitory storage device. The storage device may be memory, a hard drive, or some other type of device for storing computer-readable data. The user may be permitted to connect and disconnect external storage device 252 to increase and decrease an amount of storage space available for storing on-demand programming, service provider-managed television programming, and/or user managed television programming.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Television receiver 200 may include one or more instances of various computerized components, such as disclosed in relation to computer system 800 of FIG. 8.

Figure 3:
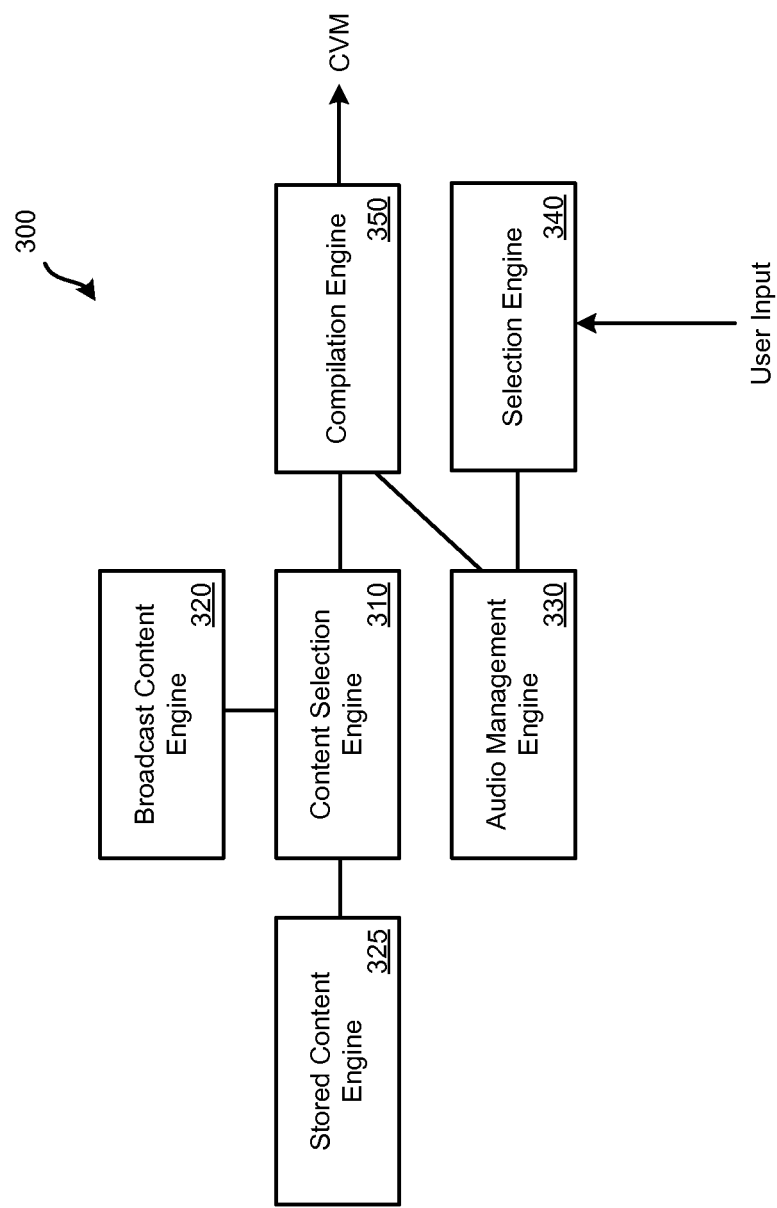
FIG. 3 illustrates an embodiment of a system for presentation of a customized video mosaic.

FIG. 3 illustrates an embodiment of mosaic management engine 300 for presentation of a customized video mosaic. Mosaic management engine 300 may be part of mosaic management engine 211 of television receiver 200 of FIG. 2. While mosaic management engine 211 is illustrated as a component of control processor 210-1, it should be understood that the functionality of mosaic management engine 300 may be distributed among various components of television receiver 200. Mosaic management engine 300 may include: content selection engine 310, broadcast content engine 320, stored content engine 325, audio management engine 330, selection engine 340, and compilation engine 350.

Content selection engine 310 may serve to select the content that is to be used to be presented via the CVM. Content selection engine 310 may select between stored content and content currently being broadcast via television channels by the television service provider. Content selection engine 310 may assess the number of tuners of the television receiver that are available for use. Tuners may be unavailable if they are already committed to tuning to a particular transponder stream, such as for viewing of a television channel or for recording of content on the television channel. It may be possible that a tuner is being used to receive the television channel for a presentation device or other television receiver in communication with the television receiver that includes mosaic management engine 300.

Content selection engine 310 may allocate portions of the CVM between broadcast content and stored content based on the number of available tuners. For instance, if only a single tuner is available for use, the CVM may be configured by content selection engine 310 to present stored content in more tiles. If several tuners are available for use, the CVM may be configured by content selection engine 310 to present more broadcast content in more tiles. If a transponder stream is present that contains preview clips for multiple television channels, only a single tuner may be needed to present multiple tiles within the CVM for various pieces of broadcast content. Content selection engine 310 may determine the amount of broadcast content and the amount of stored content presented in the CVM based on user preference, which may be stored in a user profile. For instance, a user may specify that on-demand content is never to be presented in the CVM and no more than one piece of content recorded based on a user-defined timer is to be presented as part of the CVM.

Broadcast content engine 320 may select the broadcast content to be presented in a number of allocated tiles of the CVM. As such, broadcast content engine 320 may require at least one tuner to receive broadcast content being broadcast live. In some embodiments, this may include the tuner being tuned to the preview clip transponder stream, which can be used to populate one or more tiles of the CVM. Broadcast content engine 320 may select what broadcast content is presented based on factors including: what television channels are currently being watched (or are anticipated to be watched) by the most viewers in a geographic region, the user's stored profile, a category defined by the user to be desired (e.g., sports), and/or a category determined based on viewing habits to be the most popular for the user. Television programming currently being broadcast may be associated with one or more tags that ties it to a particular category. For example, basketball games, baseball games, hockey games, and football games may be tied to a sports category.

Stored content engine 325 may select from among available content stored by the television receiver for presentation in allocated tiles of the CVM. Stored content engine 325 may choose among content stored based on user-defined timers, a provider defined timers, receiver-defined timers, and on-demand content. Stored content engine 325 may be able to access DVR database 245, programming preview database 248 (for preview clips of stored content), and/or on-demand programming 227. Factors that may be used by stored content engine 325 to select which stored content is presented via the CVM may include: content that has recently become available (e.g., recorded since the user last accessed the television receiver), on-demand content the television service provider desires to promote, and/or stored content that the user is expected to want to watch based on stored viewing habits.

In addition to using factors such as user preferences and the number of available tuners, content selection engine 310 may assess the content selected by stored content engine 325 and broadcast content engine 320 to determine which pieces of content should be presented via the CVM and in what order.

Compilation engine 350 may serve to receive the pieces of content, which may include both broadcast and stored content, for presentation as tiles in the CVM. Compilation engine 350 may format the content into a graphical user interface appropriate to be output for presentation to the user in the form of the CVM. As examples, FIGS. 4 and 5 illustrate possible embodiments of CVMs as output for presentation to a user.

Selection engine 340 may allow a user to provide input and navigate among tiles of the CVM. Navigation among tiles of the CVM may alter the audio being output. For example, the currently highlighted tile may have its audio output, while tiles that are not highlighted may only have video output. Audio management engine 330 may serve to cause the appropriate audio stream to be output to the user. Selection engine 340 may also permit a user to select a tile for viewing. By selecting a particular tile, that television program, whether stored or broadcast, may be presented in full resolution via the display device.

As an example, compilation engine 350 may output nine tiles in the form of the CVM for presentation to a user via a presentation device, such as a television. Video in all of the nine tiles may play simultaneously. For example, three tiles may correspond to stored content, while six tiles correspond to broadcast content of a category expected to be desired by the user. Compilation engine 350 (or some other component) may access EPG database 230 such that information about the content of each tile can be presented as part of the CVM. Via selection engine 340, the user may select a tile corresponding to broadcast content. While the video and/or audio for the selected tile may have been obtained from a preview clip transponder stream, selection of the clip may result in a different transponder stream being tuned to and a full resolution version of the broadcast content being output for display.

Figure 4A:
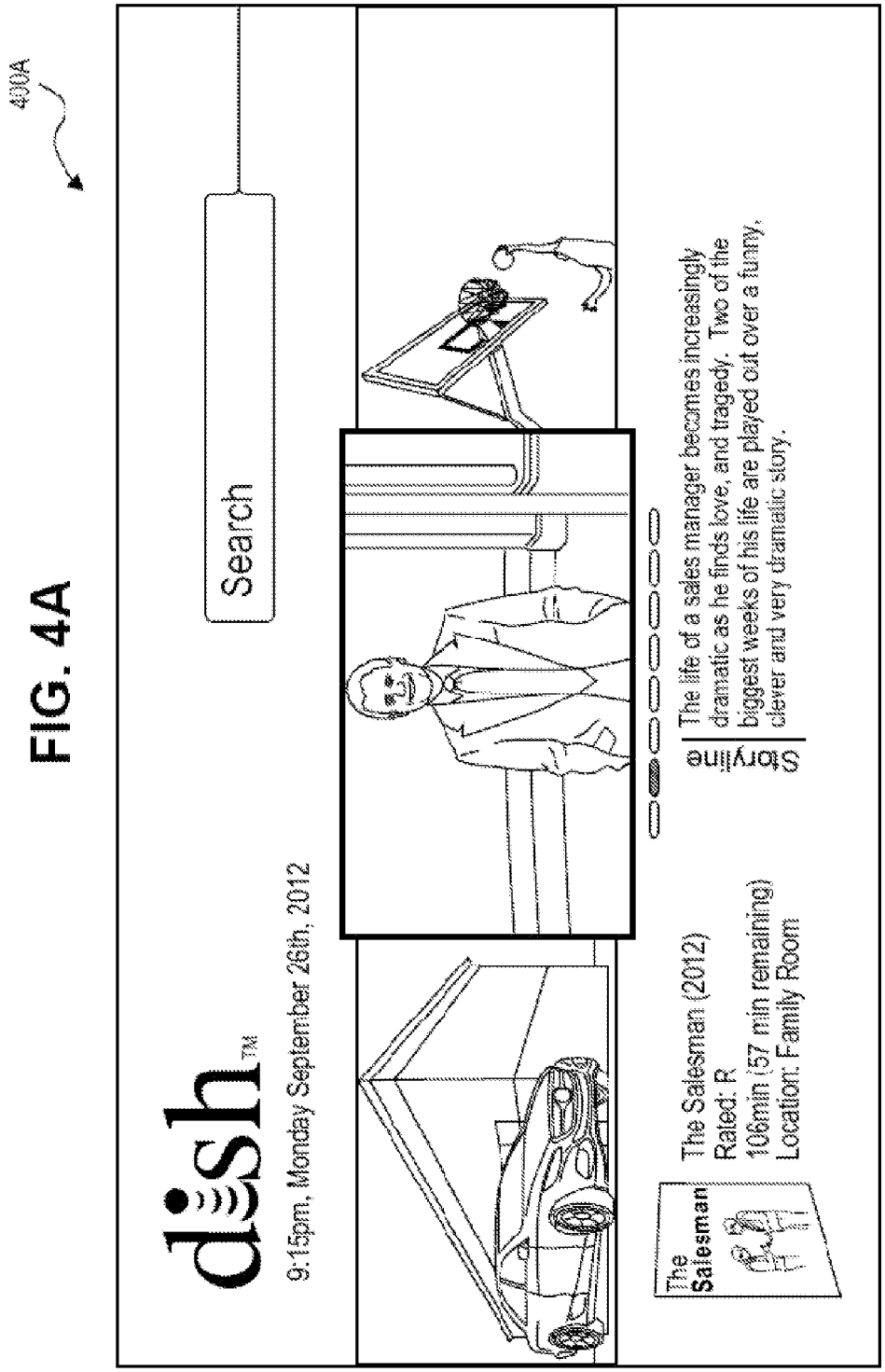
FIG. 4A illustrates an embodiment of a customized video mosaic.
Figure 5:
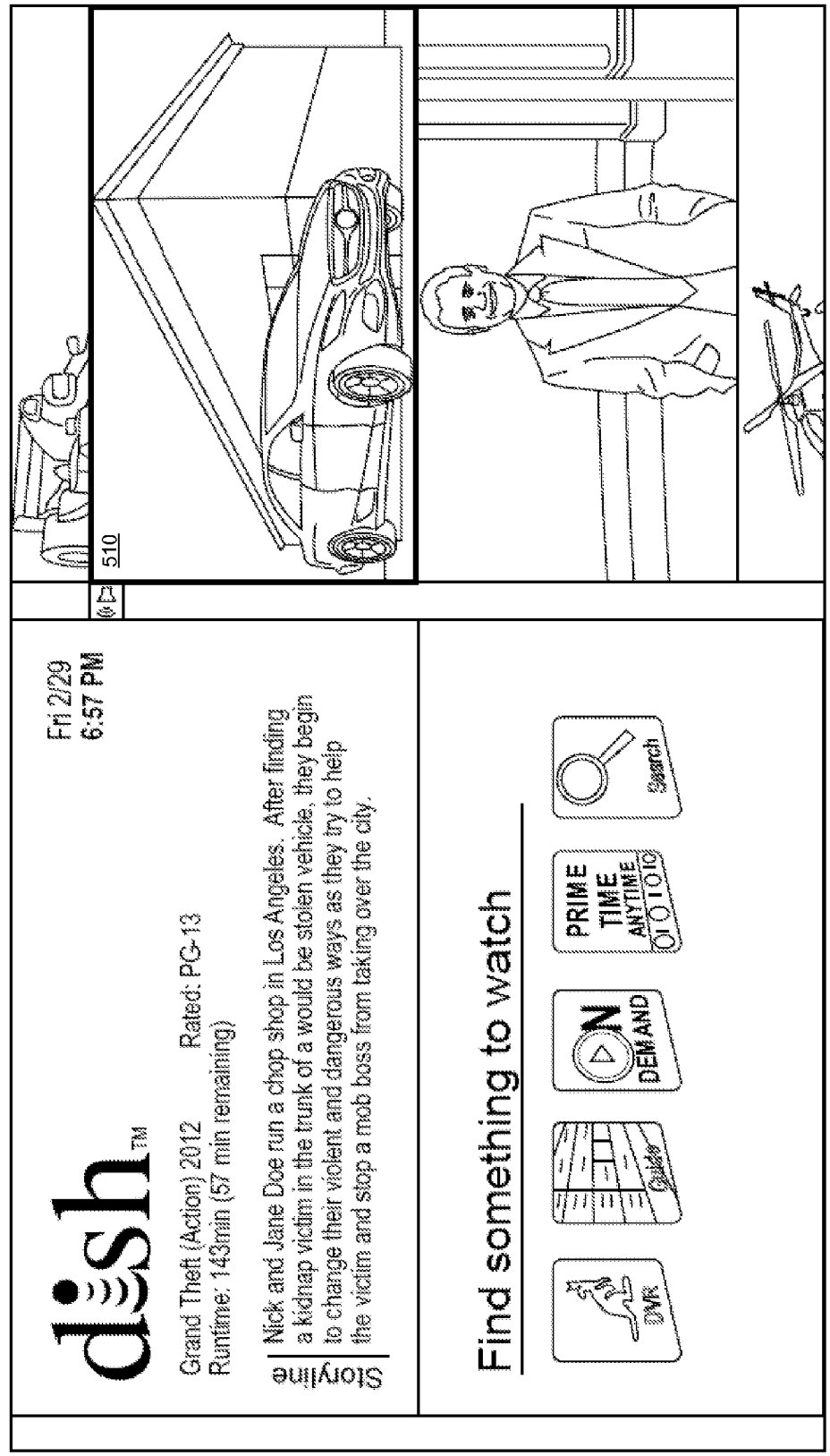
FIG. 5 illustrates another embodiment of a customized video mosaic.

FIG. 4A illustrates an embodiment 400A of a displayed CVM. This CVM may be output by a system, such as mosaic management engine 300 of FIG. 3. In this embodiment, the CVM includes three displayed tiles of video. In the illustrated CVM, a movie is receiving focus in the center of the display. As such, audio is output for only this focused piece of content. Also displayed is video associated with two other pieces of content. Focus is denoted in embodiment 400 by center placement and by the focused tile being larger than other tiles. An option to "join" a piece of content may be available. User selection of such an option may cause the CVM to cease being displayed and the selected piece of content to occupy the entire display. Such a change in presentation may result in a different stream of the piece of content being output. For example, the tile may be output from a preview clip transponder stream. If the piece of content is selected, another transponder stream is tuned to that includes a higher resolution video stream of the piece of content. In embodiment 400, scrolling may occur left-to-right and right-to-left, as tiles that are not illustrated as displayed are displayed and are focused on. Information about the piece of content, which may be obtained from the EPG database, may be displayed for the piece of content under focus. A status bar or other graphical or textual indicator, may indicate the number of pieces of content in the user's ordering. This status bar may also indicate where in the user's ordering the piece of content currently under focus is ranked.

In embodiment 400A, while three tiles are presented, the ordering created by the user may have more than three pieces of content. The rules used to determine which piece of content is to be focused on may also be used to determine which other pieces of content from the ranking are currently displayed. For instance, the viewing rules may be evaluated to determine one or more pieces of content on which focus would be given if the current piece of content under focus triggered a front-end condition. For instance, if the piece of content being focused on went to commercial, the piece of content to be focused on may be moved from adjacent on the left or right to focus. Another piece of content which was not currently presented, but is in the user's ordering, may be added to the now vacant spot in the CVM. In other embodiments, all pieces of content in the user's ordering may be presented simultaneously.

Figure 4B:
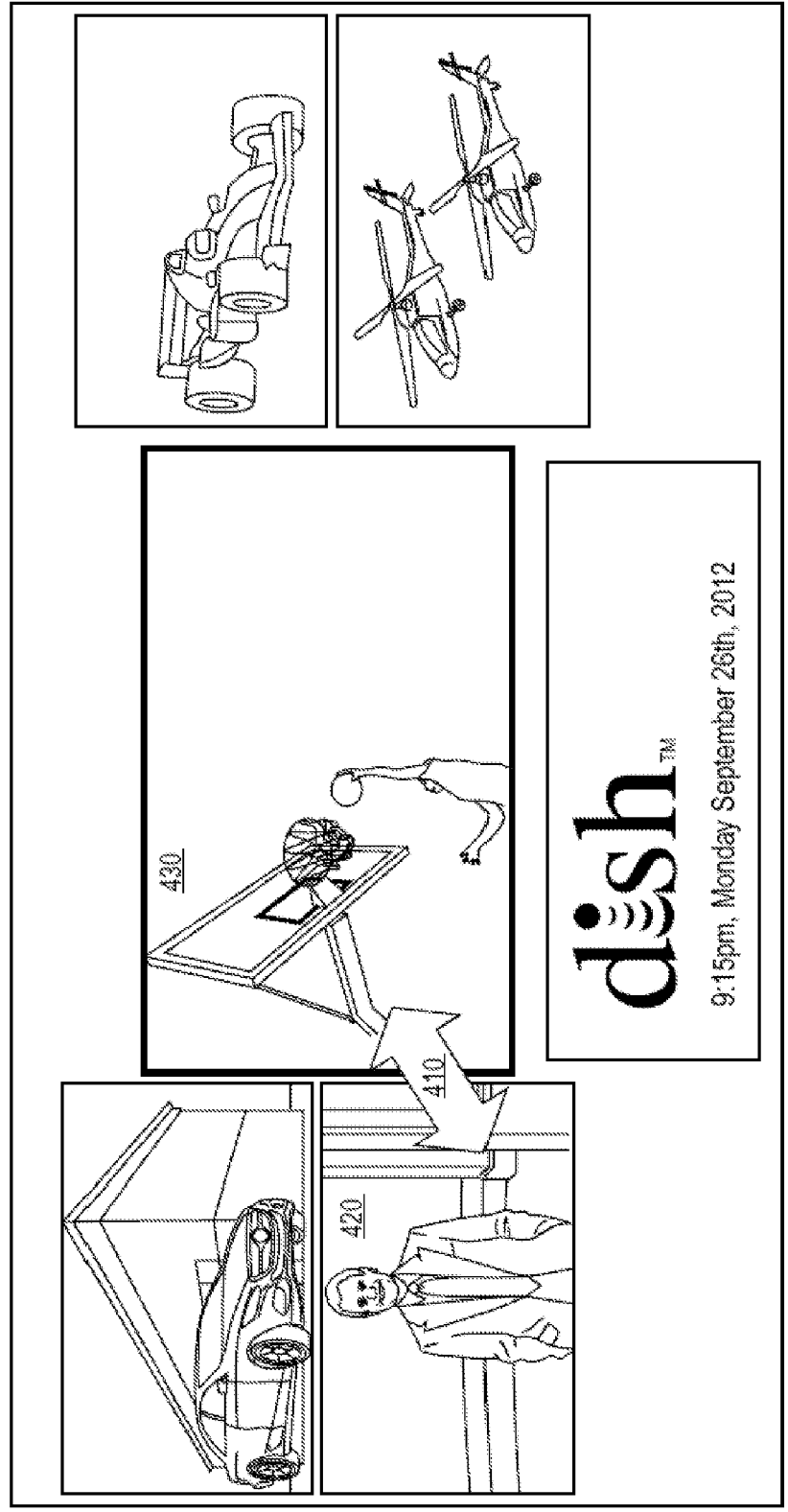
FIG. 4B illustrates another embodiment of a customized video mosaic.

FIG. 4B illustrates another embodiment 400B of a displayed CVM. In embodiment 400B, the center piece of content may be the piece of content being focused on. Pieces from the left and right of the center piece of content may be moved into the center as focus changes. For instance, arrow 410 illustrates two pieces of content being swapped in position for when piece of content 420 is to be focused on. The swap may be based on a user selecting piece of content 420, such as by providing user input indicative of a number associated with piece of content 420 or an a direction indicative of piece of content 420. In some embodiments, each piece of content may be outlined in a particular color. Pressing a remote control button indicative of the color may result in the piece of content outlined in the color being focused on. Piece of content 430 may be moved to the lower-left position of piece of content 420 to the position formerly occupied by piece of content 420. Embodiment 400B involves five pieces of content being displayed simultaneously. Which illustrated embodiment is used for presentation of pieces of content may be at least partially dependent on the number of pieces of content to be presented.

FIG. 5 illustrates another embodiment 500 of a displayed CVM. In this embodiment, scrolling may occur up and down as pieces of content in the form of tiles are displayed and focused on. In the illustrated embodiment, the piece of content 510 is focused on, which is indicated by a speaker icon (indicating an active audio output) and an enlarged border. Information about the piece of content, which may be obtained from the EPG database, may be displayed for the piece of content under focus. In embodiment 500, two tiles are partially presented. These tiles which are only partially presented may also be played back simultaneously with tiles that are fully presented. As focus shifts, these partially-displayed tiles may be scrolled on and off screen. If a user activated an audio lock for another piece of content, the speaker icon (or some other graphical identifier) may be presented in association with a tile for that piece of content, while an indication of focus is on the focused piece of content.

The pieces of content under focus and displayed, but not under focus in FIGS. 4A, 4B, and 5 may be played simultaneously. The pieces of content can include broadcast content, on-demand content, recorded content, and/or web-based content. The illustrated embodiments are intended as examples, greater or fewer numbers of tiles may be present in a CVM.

As another example, nine or more video tiles may be presented simultaneously. Each of these video tiles may be lower resolution than a full stream received via a different channel. Highlighting of a video tile may result in the audio associated with the video of the tile being output; selection of the tile may result in the video being made full screen at a higher resolution, such as by tuning to an associated television channel.

Figure 6:
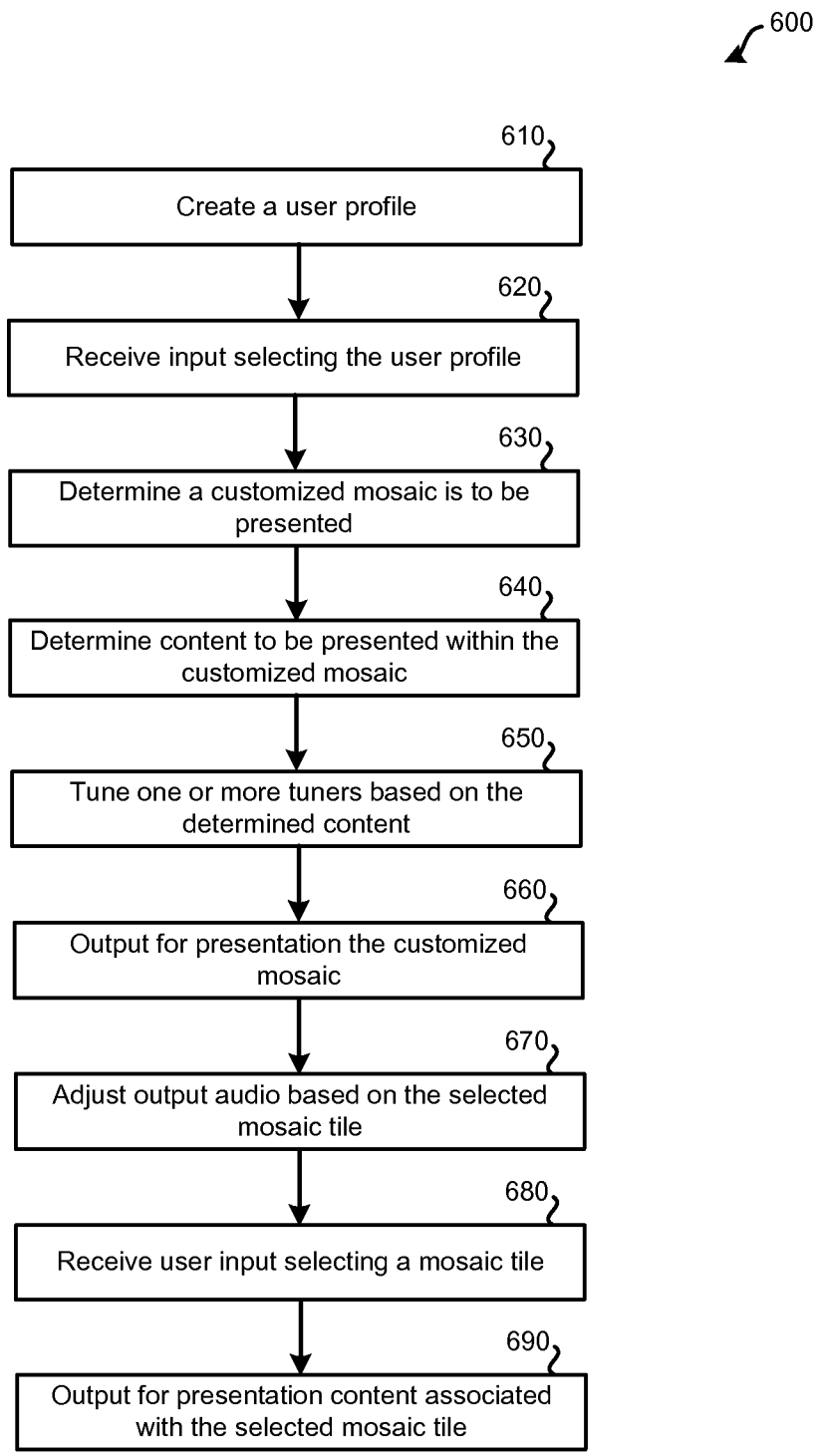
FIG. 6 illustrates an embodiment of a method for outputting a customized video mosaic for presentation.

FIG. 6 illustrates an embodiment of a method 600 for outputting a customized video mosaic for presentation. Method 600 may be performed using the systems previously described. For instance, satellite television distribution system 100, television receiver 200, and/or mosaic management engine 300 of FIGS. 1-3, respectively, may be used to perform method 600. Components of such systems may be implemented using hardware, software, and/or firmware. Further, the performance of method 700 may include one or more instances of the components of computer system 800 of FIG. 8. As such, means for performing each step of method 600 can include one or more instances of the following: one or more components of satellite television distribution system 100, one or more components of television receiver 200, one or more components of mosaic management engine 300, and/or one or more components of computer system 800 of FIG. 8.

At step 610, a user profile may be created. The user profile may be created based on preferences indicated directly by the user. The user profile may, additionally or alternatively be created based on observed characteristics of the user's interaction with the television receiver, such as based on which television channels and categories of television programming the user tends to view and/or record. While a television receiver may store multiple user profiles associated with different users, a television receiver may also store a profile representative of all users that interact with the television receiver.

At step 620, some form of input that selects a user profile may be received. The user profile may be selected based on the user pushing a button on a remote control that is associated with the user's profile, by the user being recognized by the television receiver, or by some other form of input. This step may be skipped if there is a single profile for the whole family or for the television receiver.

At step 630, it may be determined that a customized video mosaic is to be presented to the user. In some embodiments, the CVM is presented whenever the television receiver is powered on. In some embodiments, a user may provide input, such as by pressing a button on a remote control that indicates the CVM is to be presented. The CVM may also be presented in other situations.

The content to be presented within the customized mosaic may be determined at step 640. Step 640 may be performed in accordance with method 700 of FIG. 7.

At step 650, one or more tuners of the television receiver may be tuned based on the content determined to be presented as part of the CVM. A tuner may be used to present content that is currently being broadcast by the television service provider. This may involve a tuner being tuned to a transponder stream that is broadcasting full resolution versions of the broadcast content. This may additionally or alternatively involve the tuner being tuned to a transponder stream that is dedicated to transmitting reduced resolution preview clips. Such reduced resolution preview clips may match in content with the full resolution version, but may include lower quality audio and/or lower video resolution. Therefore, if a transponder stream is dedicated to the transmission of preview clips, the number of preview clips that can be transmitted using the same transponder stream may be significantly larger than if the transponder stream was also used to carry full resolution television channels. In some embodiments, reduced resolution video clips may be carried on the same transponder stream as the corresponding full resolution content.

At step 660, the customized video mosaic may be output for presentation. The output customized video mosaic may include multiple tiles of video. Such tiles may include broadcast content and/or video clips of stored content. At step 670, the output audio may be adjusted based on which tile of the mosaic is currently highlighted or otherwise selected. Audio of only one tile may be output at a given time in some embodiments, the audio is the same quality as associated with the corresponding full resolution content. In other embodiments, a lower quality audio is output as part of the CVM.

At step 680, the user may select a particular mosaic tile. The selection may indicate that the user desires to view the content of the selected tile in a larger format, such as occupying the entire display device. Upon such a selection, the full resolution version of the content may be output for presentation at step 690. If the content selected is broadcast content, this step may involve tuning a tuner of the television receiver to the transponder stream carrying the full resolution version of the selected broadcast content. If the content selected is stored content, the full resolution version of the content may be output instead of a preview clip from a stored programming preview database. Additionally, at step 680, a user may provide input as to their preference for the selected mosaic tile. For instance the user may be permitted to "thumbs up" or "thumbs down" the content of the selected tile. Such preferences may be used to update the user profile and influence what content is presented in the future as part of the CVM.

Figure 7:
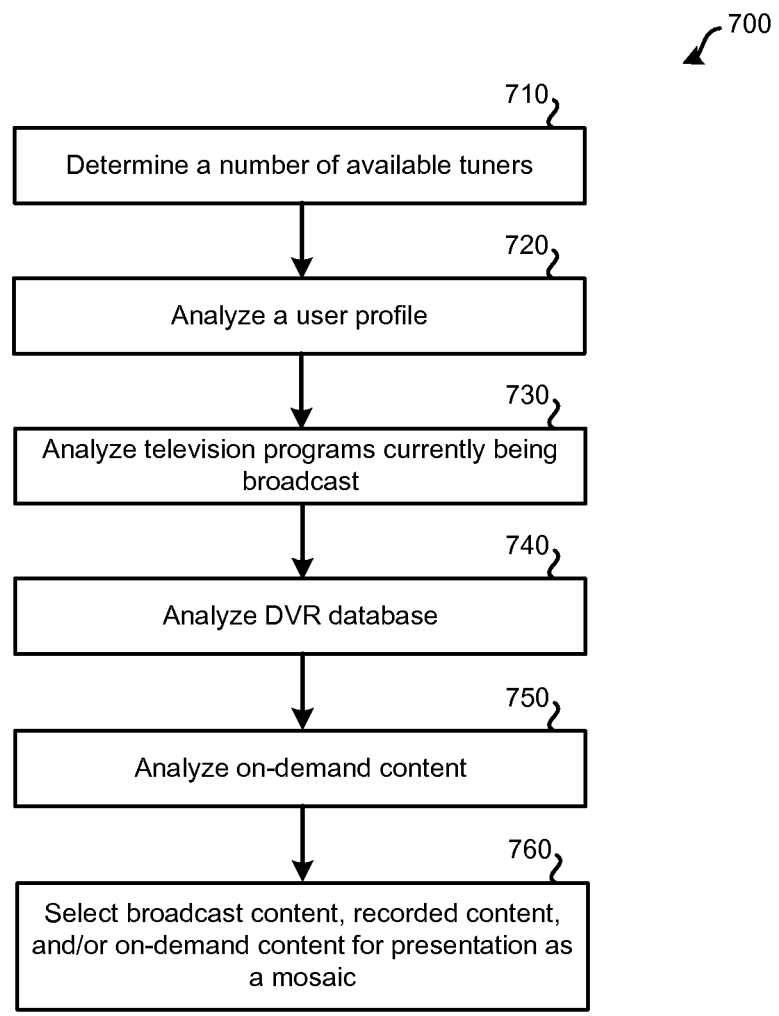
FIG. 7 illustrates an embodiment of a method for identifying content for presentation as part of a customized video mosaic.

FIG. 7 illustrates an embodiment of a method for identifying content for presentation as part of a customized video mosaic. Method 700 may be performed using the systems previously described. For instance, satellite television distribution system 100, television receiver 200, and/or mosaic management engine 300 of FIGS. 1-3, respectively, may be used to perform method 700. Components of such systems may be implemented using hardware, software, and/or firmware. Further, the performance of method 700 may include one or more instances of the components of computer system 800 of FIG. 8. As such, means for performing each step of method 700 can include one or more instances of the following: one or more components of satellite television distribution system 100, one or more components of television receiver 200, one or more components of mosaic management engine 300, and/or one or more components of computer system 800 of FIG. 8. Method 700 may represent steps that can be performed as part of step 640 of FIG. 6.

At step 710, a number of tuners that are available at the television receiver may be determined. A tuner may be considered available if it is not already committed to receiving a particular transponder stream for recording and/or output for presentation of a television channel. The number of tuners available may impact the number of tiles of the CVM that are presented containing broadcast content. At step 720, the previously created user profile may be analyzed to determine the broadcast content and/or stored content is presented via the various tiles of the CVM. The user profile of step 720 may be analyzed to determine a category of content that the user is expected to enjoy viewing. The amount of content currently being broadcast that is within the category may affect the number of tiles of the CVM that contain broadcast content as compared to stored content. Content that has been recorded by the television receiver, has yet to be viewed by the user, and that falls within a category preferred by the user may be given preference for presentation in the CVM. For instance, at step 740, the DVR database of the television receiver may be analyzed to identify stored content that was recorded based on, a user-defined timer, a provider-defined timer, and/or television receiver-defined timer.

At step 750, on-demand content may be analyzed. On-demand content may be stored locally by the television receiver (or streamed by the television service provider). On-demand content is not recorded from a broadcast. The user may have to pay to view some on-demand content. Regardless of whether the on-demand content is provided for free or for a fee, a preview of the on-demand content may be presented as part of the CVM. At step 750, the on-demand content may be analyzed to determine if, based on the user profile, any of the on-demand content may likely be desired to be viewed by the user.

At step 760, broadcast content, content recorded based on one or more timers, and/or on-demand content may be selected for presentation as part of the CVM. Such selection may be based on the number of available tuners and/or the user's profile.

Figure 8:
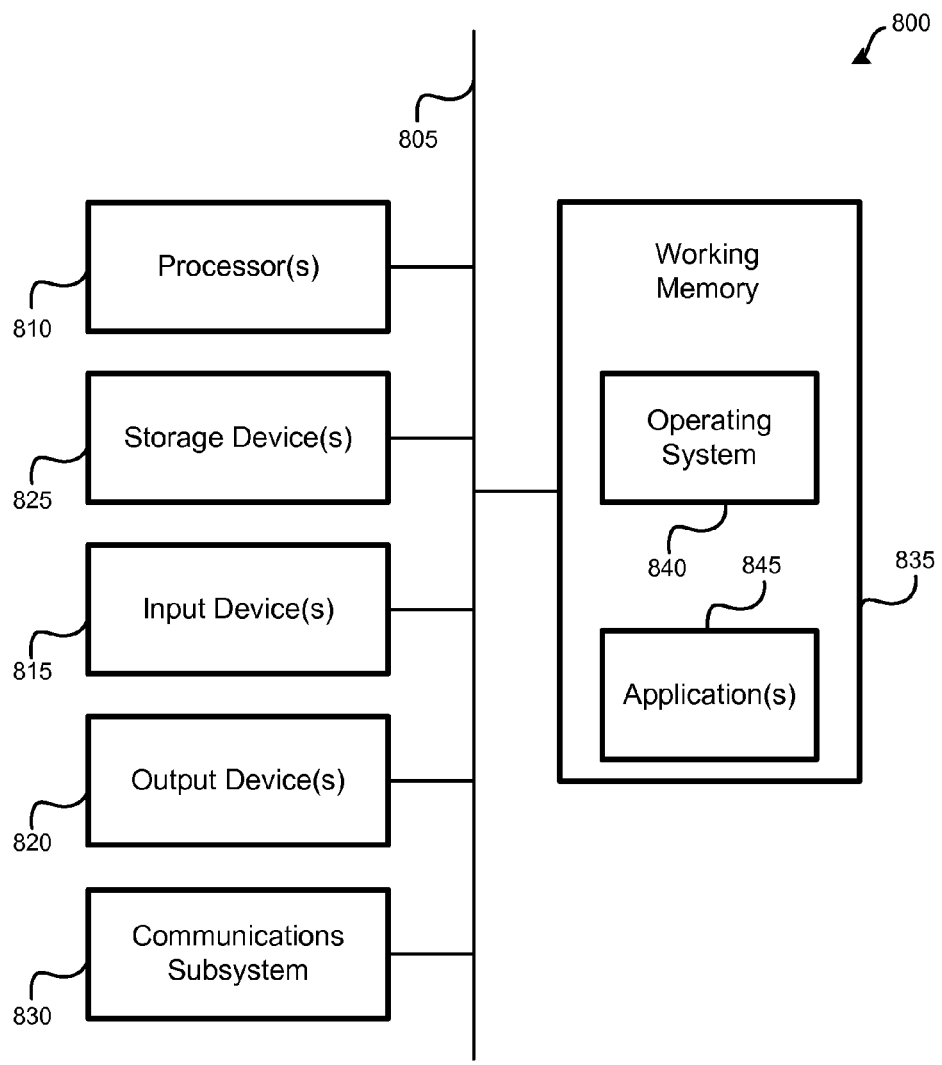
FIG. 8 illustrates an embodiment of a computer system.

A computer system as illustrated in FIG. 8 may be incorporated as part of the previously described computerized devices, such as the described television receivers and television distribution system. FIG. 8 provides a schematic illustration of one embodiment of a computer system 800 that can perform various steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, video decoders, and/or the like); one or more input devices 815, which can include without limitation a mouse, a keyboard, remote control, and/or the like; and one or more output devices 820, which can include without limitation a display device, a printer, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/ or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the non-transitory storage device(s) 825. Merely by way of example, execution of the sequences of instructions contained in the working memory 835 might cause the processor(s) 810 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 (and/or components thereof) generally will receive signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a non-transitory storage device 825 either before or after execution by the processor(s) 810.

It should further be understood that the components of computer system 800 can be distributed across a network. For example, some processing may be performed in one location using a first processor while other processing may be performed by another processor remote from the first processor. Other components of computer system 800 may be similarly distributed. As such, computer system 800 may be interpreted as a distributed computing system that performs processing in multiple locations. In some instances, computer system 800 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A television receiver configured to output a customized video mosaic, the television receiver comprising:
   one or more tuners;
   one or more processors;
   a memory communicatively coupled with and readable by the one or more processors and having stored therein processor-readable instructions which, when executed by the one or more processors, cause the one or more processors to:
   based on a first received user input, determine the customized video mosaic to be output for presentation;
   determine a plurality of television channels to be presented as part of the customized video mosaic;
   tune a tuner of the one or more tuners to a preview transponder stream based on the determined plurality of television channels to be presented, wherein:
   the preview transponder stream, transmitted to the television receiver by a television service provider, comprises live reduced resolution video streams of a plurality of television channels that comprises:
   the determined plurality of television channels and additional television channels, wherein the live reduced resolution video streams differ from each other, and the determined plurality of television channels are distributed live concurrently in higher resolution via a plurality of television channel transponder streams distinct from the preview transponder stream;
   create a plurality of packet identifier (PID) filters such that a PID filter for each television channel of the determined plurality of television channels is created to filter each television channel from the preview transponder stream;
   output for presentation the reduced resolution video streams of the determined plurality of television channels from the preview transponder stream to a presentation device based on filtering of the preview transponder stream using the plurality of PID filters, wherein each television channel of the plurality of television channels are presented by the presentation device as live video simultaneously as part of the customized video mosaic;
   receive a second user input selecting a reduced resolution video stream of a television channel from the customized video mosaic;
   determine a television channel transponder stream that comprises the television channel, the television channel being transmitted in a higher resolution as part of the television channel transponder stream than the reduced resolution video stream of the television channel transmitted as part of the preview transponder stream, wherein
   the television channel transponder stream is distinct from the reduced resolution video stream;
   tune a tuner of the one or more tuners to the television channel transponder stream that comprises the television channel transmitted in the higher resolution in response to determining the television channel transponder stream that comprises the television channel; and
   output, to the presentation device, the television channel in the higher resolution from the television channel transponder stream.

2. The television receiver configured to output the customized video mosaic of claim 1, wherein the plurality of television channels of the preview transponder stream comprises at least thirty reduced resolution video streams of television channels distributed in higher resolution via the plurality of television channel transponder streams.

3. The television receiver configured to output the customized video mosaic of claim 1, wherein at least seven television channels are output as part of the customized video mosaic simultaneously.

4. The television receiver configured to output the customized video mosaic of claim 1, wherein the processor-readable instructions that cause the one or more processors to determine the plurality of television channels to be presented as part of the customized video mosaic comprise processor-readable instructions which, when executed, cause the one or more processors to:
   determine the plurality of television channels to be presented as part of the customized video mosaic based upon a selection of a user profile.

5. The television receiver configured to output the customized video mosaic of claim 4, wherein the processor-readable instructions, when executed, further cause the one or more processors to:
   prior to determining the customized video mosaic is to be output for presentation, identify a television program on a television channel to record based on the user profile;
   record the television program on the television channel at a first resolution; and
   output for presentation the recorded television program as part of the customized video mosaic at a second resolution, wherein the second resolution is less than the first resolution.

6. The television receiver configured to output the customized video mosaic of claim 1, wherein the processor-readable instructions, when executed, further cause the one or more processors to:
   prior to determining the customized video mosaic is to be output for presentation, receive a timer from a user;
   record a television program on a television channel at a first resolution based on the timer;
   record a reduced resolution preview clip corresponding to the television program; and output for presentation the reduced resolution preview clip as part of the customized video mosaic.

7. The television receiver configured to output the customized video mosaic of claim 4, wherein the processor-readable instructions that cause the one or more processors to determine the plurality of television channels to be presented as part of the customized video mosaic based upon the selected user profile comprise processor-readable instructions which, when executed, cause the one or more processors to:
identify a category of television programming indicated by the user profile as preferred.

8. The television receiver configured to output the customized video mosaic of claim 1, wherein the processor-readable instructions, when executed, further cause the one or more processors to:
receive a third user input selecting a category of television programming to link with a user profile.

9. A method for outputting a customized video mosaic, the method comprising:
determining, by a television receiver, the customized video mosaic to be output for presentation based on a first received user input;
determining, by the television receiver, a plurality of television channels to be presented as part of the customized video mosaic;
tuning, by the television receiver, a tuner of the television receiver to a preview transponder stream transmitted by a television service provider based on the determined plurality of television channels to be presented, wherein:
the preview transponder stream comprises reduced resolution video streams of a plurality of television channels that comprises: the determined plurality of television channels and additional television channels, and
the determined plurality of television channels are distributed in higher resolution via a plurality of television channel transponder streams distinct from the preview transponder stream;
creating, by the television receiver, a plurality of packet identifier (PID) filters such that a PID filter for each television channel of the determined plurality of television channels is created to filter the determine plurality of television channels from the preview transponder stream;
outputting, by the television receiver, for presentation the reduced resolution video streams of the determined plurality of television channels from the preview transponder stream to a presentation device based on filtering of the preview transponder stream using the plurality of PID filters, wherein each television channel of the plurality of television channels are presented by the presentation device as live video simultaneously as part of the customized video mosaic;
receiving, by the television receiver, a second user input selecting a reduced resolution video stream of a television channel from the customized video mosaic;
determining, by the television receiver, a television channel transponder stream that comprises the television channel, the television channel being transmitted in a higher resolution as part of the television channel transponder stream than the reduced resolution video stream of the television channel transmitted as part of the preview transponder stream, wherein the television channel transponder stream is distinct from the reduced resolution video stream;
tuning, by the television receiver, a tuner of the one or more tuners to the television channel transponder stream that comprises the television channel transmitted in the higher resolution in response to determining the television channel transponder stream that comprises the television channel; and
outputting, by the television receiver, to the presentation device, the television channel in the higher resolution from the television channel transponder stream.

10. The method for outputting the customized video mosaic of claim 9, wherein the plurality of television channels of the preview transponder stream comprises at least thirty reduced resolution video streams of television channels distributed in higher resolution via the plurality of television channel transponder streams.

11. The method for outputting the customized video mosaic of claim 9, wherein at least seven television channels are output as part of the customized video mosaic simultaneously.

12. The method for outputting the customized video mosaic of claim 9, wherein determining the plurality of television channels to be presented as part of the customized video mosaic comprises:
determining, by the television receiver, the plurality of television channels to be presented as part of the customized video mosaic based upon a selection of a user profile.

13. The method for outputting the customized video mosaic of claim 12, the method further comprising:
prior to determining the customized video mosaic is to be output for presentation, identifying, by the television receiver, a television program on a television channel to record based on the user profile;
recording, by the television receiver, the television program on the television channel at a first resolution; and
outputting, by the television receiver, for presentation the recorded television program as part of the customized video mosaic at a second resolution, wherein the second resolution is less than the first resolution.

14. The method for outputting the customized video mosaic of claim 9, the method further comprising:
prior to determining the customized video mosaic is to be output for presentation, receiving, by the television receiver, definition of a timer from a user;
recording, by the television receiver, a television program on a television channel at a first resolution based on the timer;
recording, by the television receiver, a reduced resolution preview clip corresponding to the television program; and
outputting, by the television receiver, for presentation the reduced resolution preview clip as part of the customized video mosaic.

15. The method for outputting the customized video mosaic of claim 12, wherein determining the plurality of television channels to be presented as part of the customized video mosaic based upon the selected user profile comprises:
identifying a category of television programming indicated by the user profile as preferred.

16. A non-transitory computer-readable medium for outputting a customized video mosaic, comprising processor-readable instructions configured to cause one or more processors to:
based on a first received user input, determine the customized video mosaic to be output for presentation;
determine a plurality of television channels to be presented as part of the customized video mosaic;

tune a tuner of a television receiver to a preview transponder stream transmitted by a television service provider, such tuning being performed based on the determined plurality of television channels to be presented, wherein:
  the preview transponder stream, transmitted to the television receiver by a television service provider, comprises reduced resolution video streams of a plurality of television channels that comprises:
  the determined plurality of television channels and additional television channels, and the determined plurality of television channels are distributed in higher resolution via a plurality of television channel transponder streams distinct from the preview transponder stream;
create a plurality of packet identifier (PID) filters such that a PID filter for each television channel of the determined plurality of television channels is created to filter each television channel from the preview transponder stream:
output for presentation the reduced resolution video streams of the determined plurality of television channels from the preview transponder stream to a presentation device based on filtering of the preview transponder stream using the plurality of PID filters, wherein each television channel of the plurality of television channels are presented by the presentation device as live video simultaneously as part of the customized video mosaic;
receive user input selecting a reduced resolution video stream of a television channel from the customized video mosaic;
determine a television channel transponder stream that comprises the television channel, the television channel being transmitted in a higher resolution as part of the television channel transponder stream than the reduced resolution video stream of the television channel transmitted as part of the preview transponder stream, wherein
  the television channel transponder stream is distinct from the reduced resolution video stream;
tune a tuner of the one or more tuners to the television channel transponder stream that comprises the television channel transmitted in the higher resolution in response to determining the television channel transponder stream that comprises the television channel; and
output, to the presentation device, the television channel in the higher resolution from the television channel transponder stream.

* * * * *